United States Patent
Du et al.

(10) Patent No.: US 11,367,273 B2
(45) Date of Patent: Jun. 21, 2022

(54) DETECTING OBJECTS USING A WEAKLY SUPERVISED MODEL

(71) Applicant: Adobe Inc., San Jose, CA (US)

(72) Inventors: Delun Du, Pittsburgh, PA (US); Zhe Lin, Fremont, CA (US); Baldo Faieta, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 78 days.

(21) Appl. No.: 16/919,383

(22) Filed: Jul. 2, 2020

(65) Prior Publication Data

US 2020/0334487 A1   Oct. 22, 2020

Related U.S. Application Data

(63) Continuation of application No. 15/921,492, filed on Mar. 14, 2018, now Pat. No. 10,740,647.

(51) Int. Cl.
| | |
|---|---|
| *G06N 3/08* | (2006.01) |
| *G06K 9/62* | (2022.01) |
| *G06K 9/20* | (2006.01) |
| *G06N 3/04* | (2006.01) |
| *G06V 10/50* | (2022.01) |
| *G06V 10/22* | (2022.01) |

(52) U.S. Cl.
CPC ............ *G06V 10/50* (2022.01); *G06K 9/623* (2013.01); *G06K 9/6253* (2013.01); *G06N 3/04* (2013.01); *G06N 3/08* (2013.01); *G06V 10/22* (2022.01)

(58) Field of Classification Search
None
See application file for complete search history.

(56) References Cited

U.S. PATENT DOCUMENTS

| | | | |
|---|---|---|---|
| 6,389,168 | B2 | 5/2002 | Altunbasak et al. |
| 6,469,706 | B1 | 10/2002 | Syeda-Nahmood |
| 8,107,726 | B2 | 1/2012 | Xu et al. |
| 8,385,688 | B2 | 2/2013 | Gong et al. |
| 8,818,024 | B2 | 8/2014 | Chen et al. |
| 9,129,191 | B2 | 9/2015 | Cohen et al. |

(Continued)

FOREIGN PATENT DOCUMENTS

| | | |
|---|---|---|
| CN | 103366178 A | 10/2013 |
| CN | 107563494 A | 1/2018 |

(Continued)

OTHER PUBLICATIONS

Examination Report as received in Australian application 2018250370 dated Jun. 10, 2021.

(Continued)

*Primary Examiner* — Idowu O Osifade
(74) *Attorney, Agent, or Firm* — Keller Preece PLLC

(57) ABSTRACT

The present disclosure is directed toward systems and methods for detecting an object in an input image based on a target object keyword. For example, one or more embodiments described herein generate a heat map of the input image based on the target object keyword and generate various bounding boxes based on a pixel analysis of the heat map. One or more embodiments described herein then utilize the various bounding boxes to determine scores for generated object location proposals in order to provide a highest scoring object location proposal overlaid on the input image.

20 Claims, 11 Drawing Sheets

(56) References Cited

U.S. PATENT DOCUMENTS

| | | | |
|---|---|---|---|
| 9,171,230 | B2 | 10/2015 | Jiang et al. |
| 9,576,223 | B2 | 2/2017 | Aupetit et al. |
| 9,619,488 | B2 | 4/2017 | Ambardekar et al. |
| 9,720,934 | B1 | 8/2017 | Dube et al. |
| 9,746,981 | B2 | 8/2017 | Zachut et al. |
| 9,858,496 | B2 | 1/2018 | Sun et al. |
| 10,146,751 | B1 | 12/2018 | Zhang |
| 10,192,129 | B2 | 1/2019 | Price et al. |
| 10,216,766 | B2 | 2/2019 | Lin et al. |
| 10,496,880 | B2 | 12/2019 | Ye |
| 10,713,794 | B1 | 7/2020 | He et al. |
| 10,740,647 | B2 | 8/2020 | Du et al. |
| 10,893,283 | B2 | 1/2021 | Chen et al. |
| 11,182,408 | B2 | 11/2021 | Wu et al. |
| 2003/0179213 | A1 | 9/2003 | Liu |
| 2003/0198380 | A1 | 10/2003 | Shin et al. |
| 2003/0233224 | A1 | 12/2003 | Marchisio et al. |
| 2008/0069444 | A1 | 3/2008 | Wilensky |
| 2009/0281925 | A1 | 11/2009 | Winter et al. |
| 2010/0158412 | A1 | 6/2010 | Wang et al. |
| 2010/0166321 | A1 | 7/2010 | Sawant et al. |
| 2011/0026835 | A1 | 2/2011 | Ptucha et al. |
| 2011/0029553 | A1 | 2/2011 | Bogart et al. |
| 2011/0085739 | A1 | 4/2011 | Zhang et al. |
| 2011/0216973 | A1 | 9/2011 | Mojsilovic |
| 2013/0257886 | A1 | 10/2013 | Kerofsky et al. |
| 2014/0334722 | A1 | 11/2014 | Bloore et al. |
| 2015/0169142 | A1* | 6/2015 | Longo ............... H04L 67/18 715/751 |
| 2015/0170005 | A1 | 6/2015 | Cohen et al. |
| 2015/0213058 | A1 | 7/2015 | Ambardekar et al. |
| 2015/0228086 | A1 | 8/2015 | Maurer et al. |
| 2015/0379006 | A1 | 12/2015 | Dorner et al. |
| 2016/0342863 | A1 | 11/2016 | Kwon et al. |
| 2017/0017696 | A1* | 1/2017 | Alonso ............... G06F 3/0484 |
| 2017/0083752 | A1 | 3/2017 | Saberian et al. |
| 2017/0140236 | A1 | 5/2017 | Price et al. |
| 2017/0206431 | A1 | 7/2017 | Sun et al. |
| 2017/0255378 | A1 | 9/2017 | Desai |
| 2017/0277948 | A1 | 9/2017 | Dhua et al. |
| 2017/0287137 | A1 | 10/2017 | Lin et al. |
| 2018/0108137 | A1 | 4/2018 | Price et al. |
| 2018/0267997 | A1 | 9/2018 | Lin et al. |
| 2019/0019318 | A1 | 1/2019 | Cinnamon et al. |
| 2019/0108250 | A1 | 4/2019 | Miller et al. |
| 2019/0130229 | A1 | 5/2019 | Lu et al. |
| 2019/0252002 | A1 | 8/2019 | Ding et al. |
| 2019/0354609 | A1 | 11/2019 | Huang et al. |
| 2020/0020108 | A1 | 1/2020 | Pao et al. |
| 2020/0218931 | A1 | 7/2020 | Karlinsky et al. |
| 2020/0250538 | A1 | 8/2020 | Li et al. |
| 2020/0302230 | A1 | 9/2020 | Chang et al. |
| 2020/0334501 | A1 | 10/2020 | Lin et al. |
| 2021/0027448 | A1 | 1/2021 | Cohen et al. |
| 2021/0027471 | A1 | 1/2021 | Cohen et al. |
| 2021/0027497 | A1 | 1/2021 | Ding et al. |
| 2021/0192375 | A1 | 6/2021 | Xia et al. |

FOREIGN PATENT DOCUMENTS

| | | |
|---|---|---|
| EP | 3 300 024 A1 | 3/2018 |
| WO | WO 2017/007626 A1 | 1/2017 |

OTHER PUBLICATIONS

U.S. Appl. No. 16/518,880, Apr. 7, 2021, Notice of Allowance.
U.S. Appl. No. 16/518,810, Apr. 16, 2021, 1st Action Office Action.
U.S. Appl. No. 16/518,795, May 6, 2021, Office Action.
U.S. Appl. No. 16/817,418, Mar. 22, 2021, Notice of Allowance.
U.S. Appl. No. 16/518,850, Apr. 6, 2021, Preinterview 1st Office Action.
U.S. Appl. No. 16/518,850, May 28, 2021, 1st Action Office Action.
Combined Search and Examination Report as received in United Kingdom Application GB2005714.7 dated Sep. 3, 2020.
Examination Report as received in Australian application 2020201988 dated Oct. 29, 2021.
U.S. Appl. No. 16/518,850, Nov. 4, 2021, Office Action.
Combined Search and Examination Report as received in UK Application GB2005865.7 dated Jan. 11, 2021.
J. Uijlings, K. van de Sande, T. Gevers, and A. Smeulders. Selective Search For Object Recognition, IJCV, 2013.
Joseph Redmon, Santosh Divvala, Ross Girshick, Ali Farhadi: You Only Look Once: Unified, Real-Time Object Detection, arXiv: 1506.02640, May 6, 2016.
Bency, Archith John, et al. "Weakly supervised localization using deep feature maps." European Conference on Computer Vision. Springer, Cham, 2016, See Abstract and section 3.4.
Bolanos, Marc, and Petia Radeva. "Simultaneous food localization and recognition." 2016 23rd International Conference on Pattern Recognition (ICPR). IEEE, 2016 See Abstract, Figure 3 and the Methodology section.
Combined Search and Examination Report as received in United Kingdom Application GB1817588.5 dated Apr. 8, 2019.
Ning Xu et al., "Deep GrabCut for Object Selection," published Jul. 14, 2017.
S. Ren, K. He, R. Girshick, and J. Sun, Faster r-cnn: Towards real-time object detection with region proposal networks, NIPS, 2015.
Yi-Hsuan Tsai et al., "Sky is Not the Limit: Semantic-Aware Sky Replacement," ACM Transactions on Graphics (SIGGRAPH), 2016.
Yufei Wang et al., "Concept Mask: Large-Scale Segmentation from Semantic Concepts," The European Conference on Computer Vision (ECCV), Aug. 18, 2018.
U.S. Appl. No. 15/921,492, Dec. 27, 2019, Office Action.
U.S. Appl. No. 15/921,492, Apr. 2, 2020, Notice of Allowance.
Examination Report as received in Australian application 2020202602 dated Oct. 18, 2021.
Intention to Grant as received in Australian application 2018250370 dated Oct. 21, 2021.
U.S. Appl. No. 16/518,810, Oct. 27, 2021, Office Action.
Combined Search and Examination Report as received in United Kingdom Application GB2005704.8 dated Sep. 24, 2020.
Intention to Grant as received in United Kingdom Application GB1817588.5 dated Aug. 13, 2020.
Examination Report as received in Australian application 2020202602 dated Nov. 22, 2021.
Notice of Grant as received in Australian Application 2020202658 dated Dec. 23, 2021.
Notice of Grant as received in United Kingdom application GB2005704.8 dated Nov. 16, 2021.
U.S. Appl. No. 16/518,795, Dec. 7, 2021, Notice of Allowance.
Kirillov, Alexander & Girshick, Ross & He, Kaiming & Dollar, Piotr. (2019). Panoptic Feature Pyramid Networks. 6392-6401. 10.1109/CVPR.2019.00656.
Gouet, Valerie, and Nozha Boujemaa. "Object-based queries using color points of interest." Proceedings IEEE Workshop on Content-Based Access of Image and Video Libraries (CBAIVL 2001). IEEE, 2001. (Year: 2001).
Wang, Jiang, et al. "Learning fine-grained image similarity with deep ranking." Proceedings of the IEEE Conference on Computer Vision and Pattern Recognition. 2014. (Year: 2014).
Niblack, Carlton Wayne, et al. "QBIC project: querying images by content, using color, texture, and shape." Storage and retrieval for image and video databases. Vol. 1908. International Society for Optics and Photonics, 1993. (Year: 1993).
Wan et al., Deep Learning for Content-Based Image Retrieval: Comprehensive Study, Published in MM '14: Proceedings of the ACM International Conference on Multimedia: Nov. 3-7, 2014, Orlando, pp. 157-166. http://doi.org/10.1145/2647868.2654948 (Year: 2014).
Carion, Nicolas et al. "End-to-End Object Detection with Transformers," arXiv preprint arXiv:2005.12872 (2020).
U-net architecture and use techniques and approaches found in Olaf Ronneberger et al., "U-Net: Convolutional Networks for Biomedical Image Segmentation," submitted on May 18, 2015, arXiv:1505.049597.

(56) References Cited

OTHER PUBLICATIONS

Wang et al. in Joint Object and Part Segmentation using Deep Learned Potentials, In Proc. International Conference on Computer Vision (ICCV), 2015.
J. Dong et al.; Towards Unified Human Parsing And Pose Estimation, In CVPR, pp. 843-850, 2014.
U.S. Appl. No. 16/518,880, Dec. 23, 2020, Office Action.
U.S. Appl. No. 16/518,810, Jan. 8, 2021, Preinterview 1st Office Action.
U.S. Appl. No. 16/518,795, Jan. 21, 2021, Preinterview 1st Office Action.
Combined Search and Examination Report as received in United Kingdom Application GB2004362.6 dated Nov. 13, 2020.
Examination Report as received in United Kingdom GB2005865.7 dated Sep. 14, 2021.
Examination Report as received in Australian application 2020202658 dated Sep. 14, 2021.
Examination Report as received in Australian application 2020202602 dated Sep. 14, 2021.
Intention to Grant as received in United Kingdom Application GB2005704.8 dated Sep. 30, 2021.
U.S. Appl. No. 16/518,795, Sep. 15, 2015, Notice of Allowance.
U.S. Appl. No. 16/518,810, Jul. 15, 2021, Office Action.
U.S. Appl. No. 16/518,850, Jun. 18, 2021, Office Action.
Examination Report as received in Australian application 2020202601 dated Nov. 5, 2021.
Examination Report as received in United Kingdom application GB2005865.7 dated Dec. 14, 2021.
U.S. Appl. No. 16/518,850, filed Jan. 25, 2022, Office Action.
U.S. Appl. No. 16/800,415, filed Feb. 17, 2022, Preinterview 1st Office Action.
Notice of Grant as received in Australian application 2020201988 dated Mar. 17, 2022.
U.S. Appl. No. 16/518,810, filed Apr. 14, 2022, Office Action.
U.S. Appl. No. 16/800,415, filed Apr. 4, 2022, 1st Action Office.

* cited by examiner

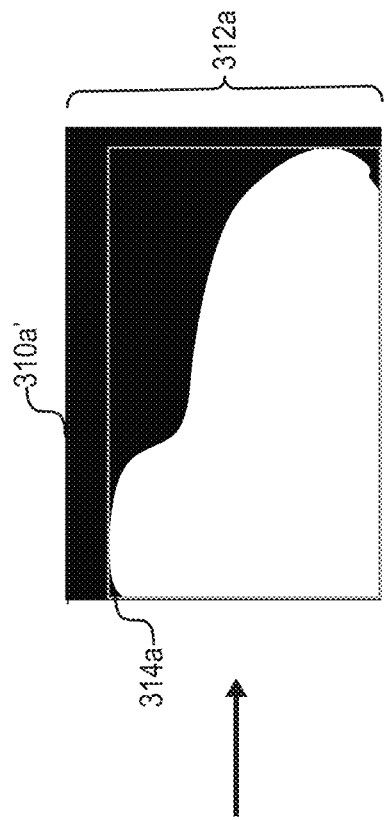
Fig. 4A
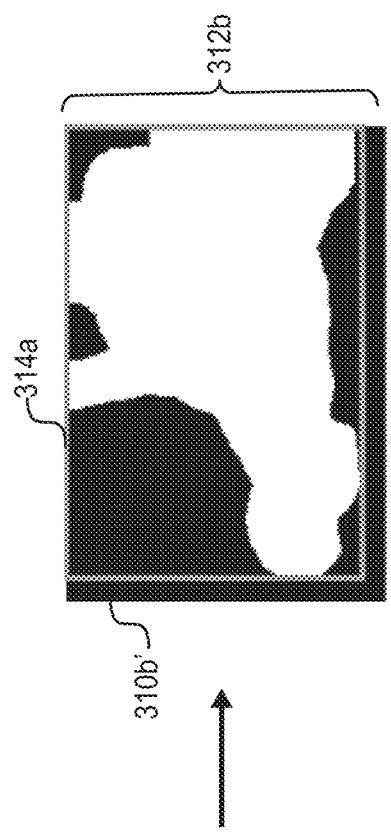
Fig. 4B
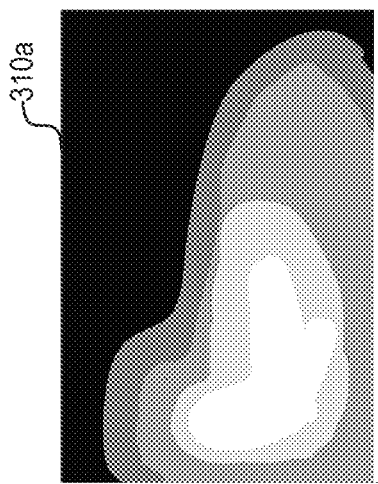
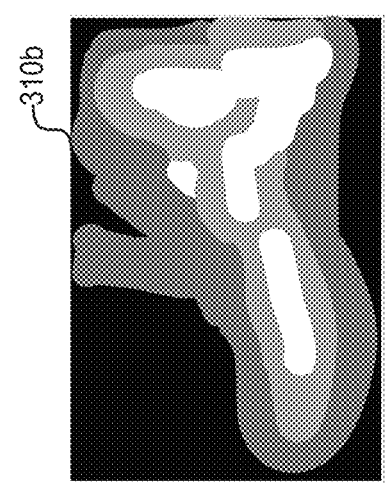

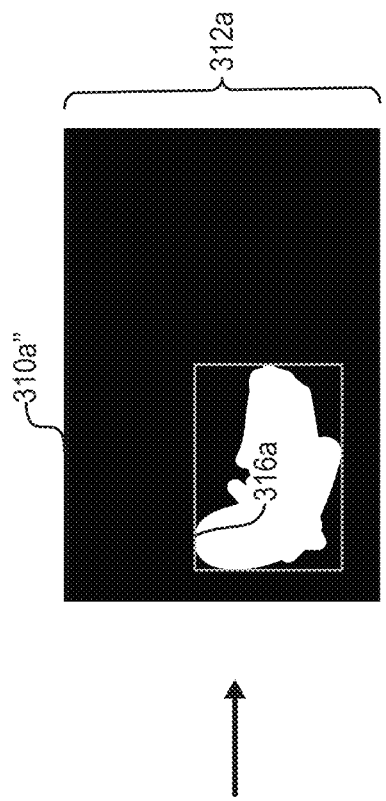
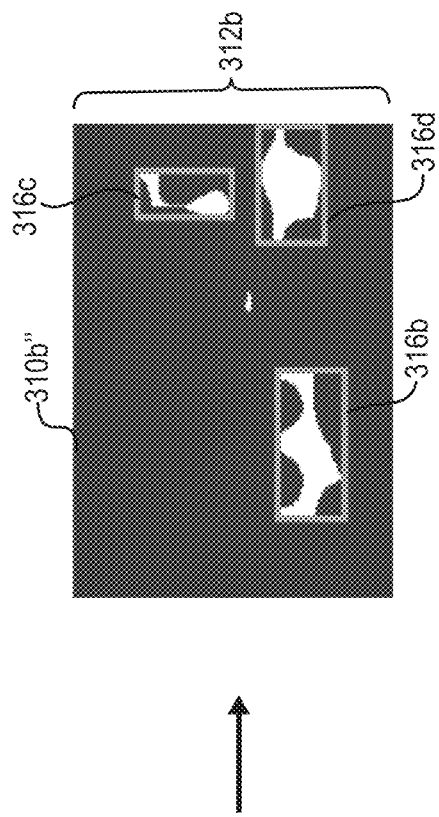
Fig. 5A
Fig. 5B

DETECTING OBJECTS USING A WEAKLY SUPERVISED MODEL

CROSS-REFERENCE TO RELATED APPLICATIONS

The present application is a continuation of U.S. application Ser. No. 15/921,492, filed on Mar. 14, 2018. The aforementioned application is hereby incorporated by reference in its entirety.

BACKGROUND

Recent years have seen rapid technological development of automatic object detection in digital images. Indeed, as a result of the proliferation of personal computing devices and digital cameras, individuals and businesses now routinely manage large repositories of digital images and digital videos. Accordingly, automatic object detection in digital images has become a ubiquitous need for individuals and businesses in a variety of scenarios ranging from casual users seeking to locate specific moments from a personal photo collection to professional graphics designers sorting through stock images to enhance creative projects.

Unfortunately, conventional object detection systems suffer from a number of drawbacks. For example, the most accurate conventional object detection systems all involve one form of machine learning. These conventional machine learning methods require supervised learning (human-annotated training data) for training or they do not provide useful predictions. Generating annotated images for training is both time consuming and expensive.

Due to the need for supervised data, conventional object detection systems are only able to identify small numbers of types of objects. Indeed, conventional object detection system typically are only able to identify 20 types of objects with reasonable accuracy. Some conventional object detection systems can identify as many as 80 or even 120 different types of object but at unacceptable accuracy levels.

Accordingly, a need exists for robust, efficient, and effective detection of objects in large datasets of digital images.

BRIEF SUMMARY

One or more embodiments of the present disclosure provide benefits and/or solve one or more of the foregoing or other problems in the art with systems, computer-readable media, and methods that employ a weakly supervised learning model that allows for automatic detection of objects in digital images in a manner that allows for detection of large numbers of categories in large datasets. In particular, in one or more embodiments, the disclosed systems perform object detection in connection with a digital image by generating a heat map of the digital image based on a target object keyword. Moreover, the disclosed systems then generate one or more bounding boxes based on a pixel analysis associated with the heat map. In one or more embodiments, the disclosed systems then score various object location proposals based on each object location proposal's interplay with the one or more generated bounding boxes. Ultimately, the disclosed systems output a bounding box overlaid on a location or position in the digital image that corresponds with a highest scoring object location proposal. In this manner, the disclosed systems and methods quickly and precisely detect objects in digital images without having to be trained using supervised learning.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

The detailed description is described with reference to the accompanying drawings in which:

FIGS. 4A-4B illustrate example boundary boxes in accordance with one or more embodiments;

FIGS. 5A-5B illustrate example center boxes in accordance with one or more embodiments;

DETAILED DESCRIPTION

Figure 1A:
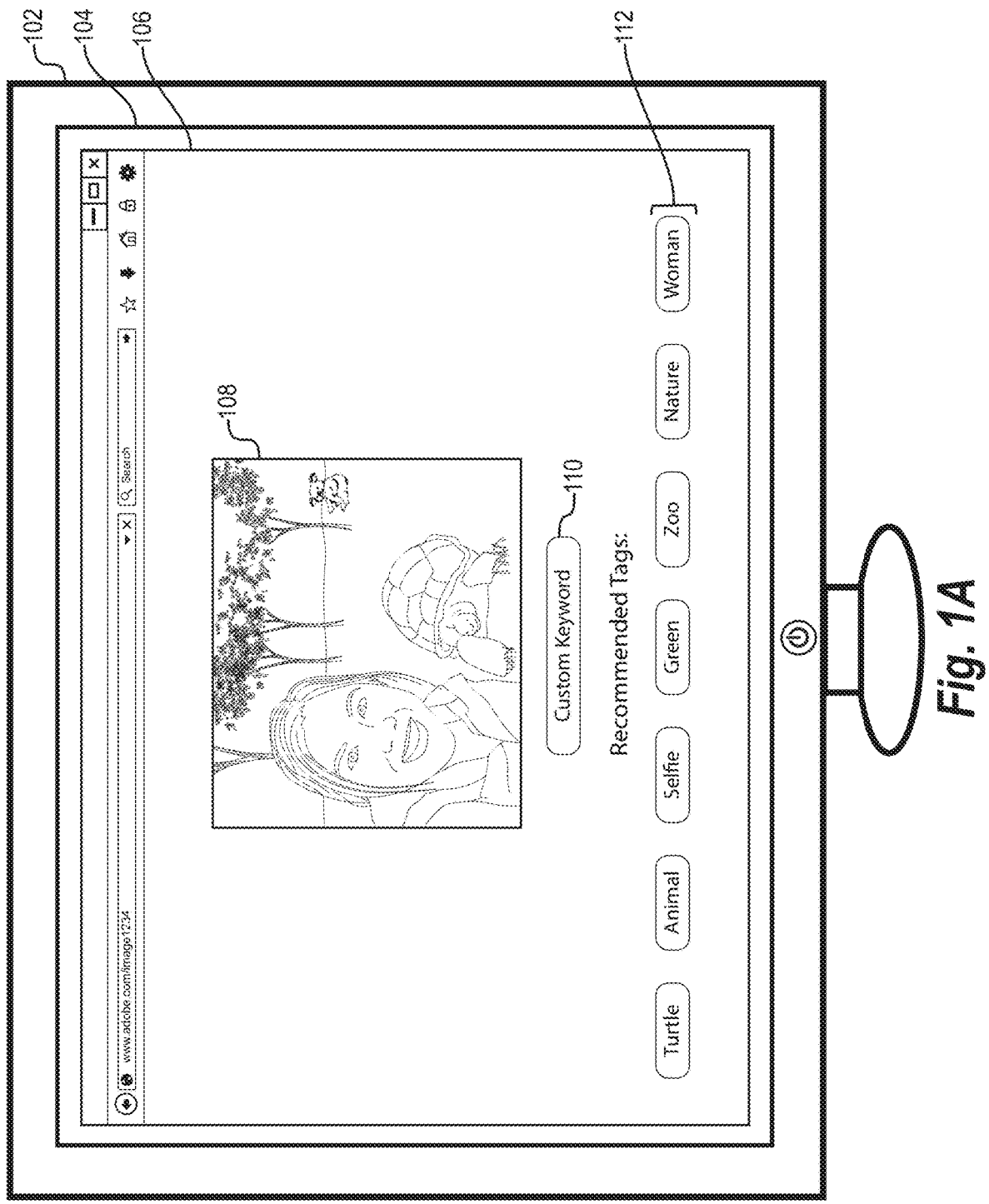
FIGS. 1A-1B illustrate graphical user interfaces illustrating object detection functionality of an object detection system in accordance with one or more embodiments.

This application discloses various embodiments of an object detection system that uses a weakly supervised learning model to perform object detection. In accordance with one or more embodiments, the object detection system detects objects in an input image based on a received target object keyword. In particular, the object detection system first generates a heat map of the input image based on the target object keyword. The object detection system then generates various bounding boxes based on a pixel analysis of the heat map and scores object location proposals based on an interplay between each proposal and the generated bounding boxes. The object detection system outputs an indication of the highest scoring object location proposal overlaid on input image in order to show the position of the detected object associated with the target object keyword in the input image.

To further illustrate the features and functionality of the object detection system, in one or more embodiments, the object detection system receives a target object keyword and an input image (or collection of images). In response to receiving the input image and the target object keyword, the object detection system generates a heat map associated with the input image and the target object keyword. As used herein, a "heat map" refers to a graphical representation of data that conveys data based on an image-to-topic embedding approach. In particular, a heat map can comprise a map of an image that indicates portions of the image likely to include an object corresponding to a target object keyword. For example, the object detection system can generate a heat map based on the input image and the target object keyword using an embedding network such that the color in every region of the heat map (e.g., every pixel) conveys a likelihood that the given pixel is part of an object corresponding to the target object keyword.

For example, in one or more embodiments, the object detection system utilizes a fully-convolutional dense tagging network that receives an input image and a target object keyword and outputs a heat map. In one or more embodiments, the fully-convolutional dense tagging network (e.g., as will be described in greater detail below) performs an analysis of color, texture, lines, and so forth in every region or pixel of the input image to determine a likelihood of whether that region is associated with the target object keyword. In at least one embodiment, the fully-convolutional dense tagging network places lighter pixels in a region of the heat map that corresponds to a likely location of the target object keyword in the input image.

The resulting color-coded heat map indicates a general location in the input image corresponding to the target object keyword. This general location, however, can lack sufficient specificity to allow the object detection system to clearly indicate the location or position of the target object. Accordingly, in response to generating the heat map of the input image based on the target object keyword, the object detection system generates a more precise location of an object corresponding to the target object keyword using bounding boxes and object proposals based on the heat map.

For example, the object detection system first generates a boundary box based on the heat map. In one or more embodiments, the object detection system generates the boundary box by identifying pixels in the heat map with pixel values greater than a global threshold. After identifying the pixels in the heat map with pixel values greater than the global threshold, the object detection system performs various transformations on the identified pixels in order to generate a fully-connected region or shape within the heat map. In at least one embodiment, the object detection system then fits a rectangle (e.g., a bounding box) to the shape or region to generate the boundary box.

The object detection system then generates one or more center boxes based on the heat map. In one or more embodiments, the object detection system generates one or more center boxes by identifying pixels with the maximum pixel values in every row and column in the heat map. The object detection system then performs the various transformations on each region of identified pixels in order to generate one or more fully-connected shapes within the heat map. Finally, the object detection system fits a bounding box to every fully-connected shape in the heat map to generate the one or more center boxes.

After generating the boundary box and the one or more center boxes, the object detection system generates one or more object location proposals. As used herein, an "object location proposal" refers to a predicted location or region in the input image associated with the target object keyword. For example, in one or more embodiments, the object detection system utilizes various methods to generate one or more object location proposals that include coordinates outlining a predicted location or region in the input image that includes an object specified by the target object keyword. In at least one embodiment, and as will be described further below, the object detection system utilizes a selective search method (such as that described in J. Uijlings, K. van de Sande, T. Gevers, and A. Smeulders. *Selective Search For Object Recognition*, IJCV, 2013, the entire contents of which are hereby incorporated by reference) and a YOLO ("You Only Look Once") network method (such as that described in Joseph Redmon, Santosh Divvala, Ross Girshick, Ali Farhadi: *You Only Look Once: Unified, Real-Time Object Detection*, arXiv:1506.02640, May 6, 2016, the entire contents of which are hereby incorporated by reference) to generate the one or more object location proposals.

In order to identify the best object location proposals, the object detection system determines a score for each of the one or more object location proposals based on the generated boundary box and one or more center boxes. For example, in at least one embodiment, the object detection system determines the score for an object location proposal based on an amount of overlap between the object location proposal and the boundary box, and on an amount of overlap between the object location proposal and each of the one or more center boxes. After determining scores for each of the one or more object location proposals, the object detection system filters out bad proposals with scores lower than a predetermined threshold.

In response to identifying at least one high scoring object location proposal, the object detection system overlays an indication of that object location proposal on the input image at the coordinates specified by the object location proposal. The object detection system then provides the input image overlaid with the indication. For example, the object detection system can provide the input image overlaid with the indication for display on a client device. Alternatively, the object detection system can add the input image overlaid with the indication to a collection of other input images the object detection system has determined to include an object corresponding to the target object keyword (e.g., as part of a batch process including a large dataset of input images).

Thus, the object detection system provides a computer-based solution to an existing problem in automatic object detection. For example, rather than relying on costly human-annotated training data, the object detection system utilizes a weakly supervised learning model. As such, training is much faster than conventional systems as there is no need to perform time consuming annotation of images.

Furthermore, the object detection system is more robust than conventional systems. Indeed, rather than being able to identify objects from 20 to 100 object categories, the object detection system can detect all object categories in a dataset (e.g., 40,000 or more categories). As such, the object detection system can be used in connection with large scale industry datasets.

Figure 1B:
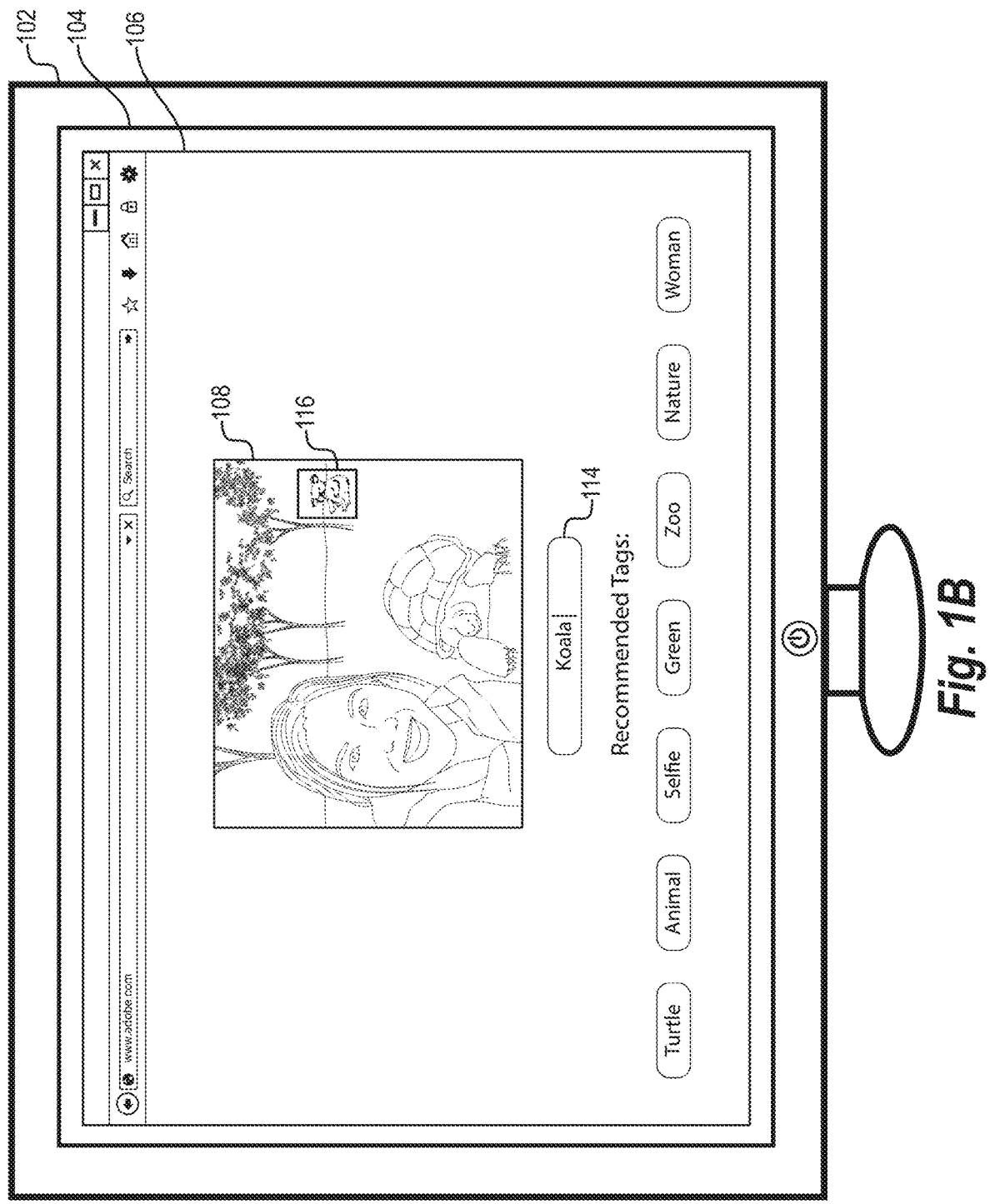

FIGS. 1A and 1B illustrate example graphical user interfaces displaying one or more features of the object detection system. For example, as shown in FIG. 1A, the object detection system can provide an object detection graphical user interface 106 via a client-computing device 102. In one or more embodiments, when the object detection system is a server-hosted application the object detection graphical user interface 106 can be provided via a web browser 104. In particular, a user can identify, upload, or select an input image 108 or set of images. In response, the object detection system displays the input image 108 in the object detection graphical user interface 106.

Additionally, the object detection system provides the keyword input box 110 and the recommended tags 112 in the object detection graphical user interface 106. In one or more embodiments, the object detection system receives a target object keyword via the keyword input box 110. In response to receiving the target object keyword via the keyword input box 110, the object detection system provides an indication of a region in the input image 108 that corresponds with the target object keyword.

For example, as shown in FIG. 1B, in response to receiving the target object keyword, "Koala," via the keyword input box 110, the object detection system provides the indication 116 associated with an object location in the input image 108 that is associated with the received target object keyword. For instance, as shown in FIG. 1B, the indication 116 is a bounding box overlaid on the input image 108 such that the detected object (e.g., the koala) is within the corner coordinates of the bounding box.

Although the object detection features of the object detection system are described in FIGS. 1A and 1B in association with a single input image displayed via the object detection graphical user interface 106, the object detection system can perform the same object detection as part of a batch process. For example, in at least one embodiment, the object detection system receives a batch command to process a large dataset of input images in connection with a target object keyword. In response to receiving this batch command, the object detection system detects the object associated with the target object keyword in each of the input images in the dataset. However, in at least one embodiment, instead of outputting a graphical display of the indication associated with an object location in each input image, the object detection system stores coordinates associated with each determined indication in connection with the corresponding input image.

Figure 2:
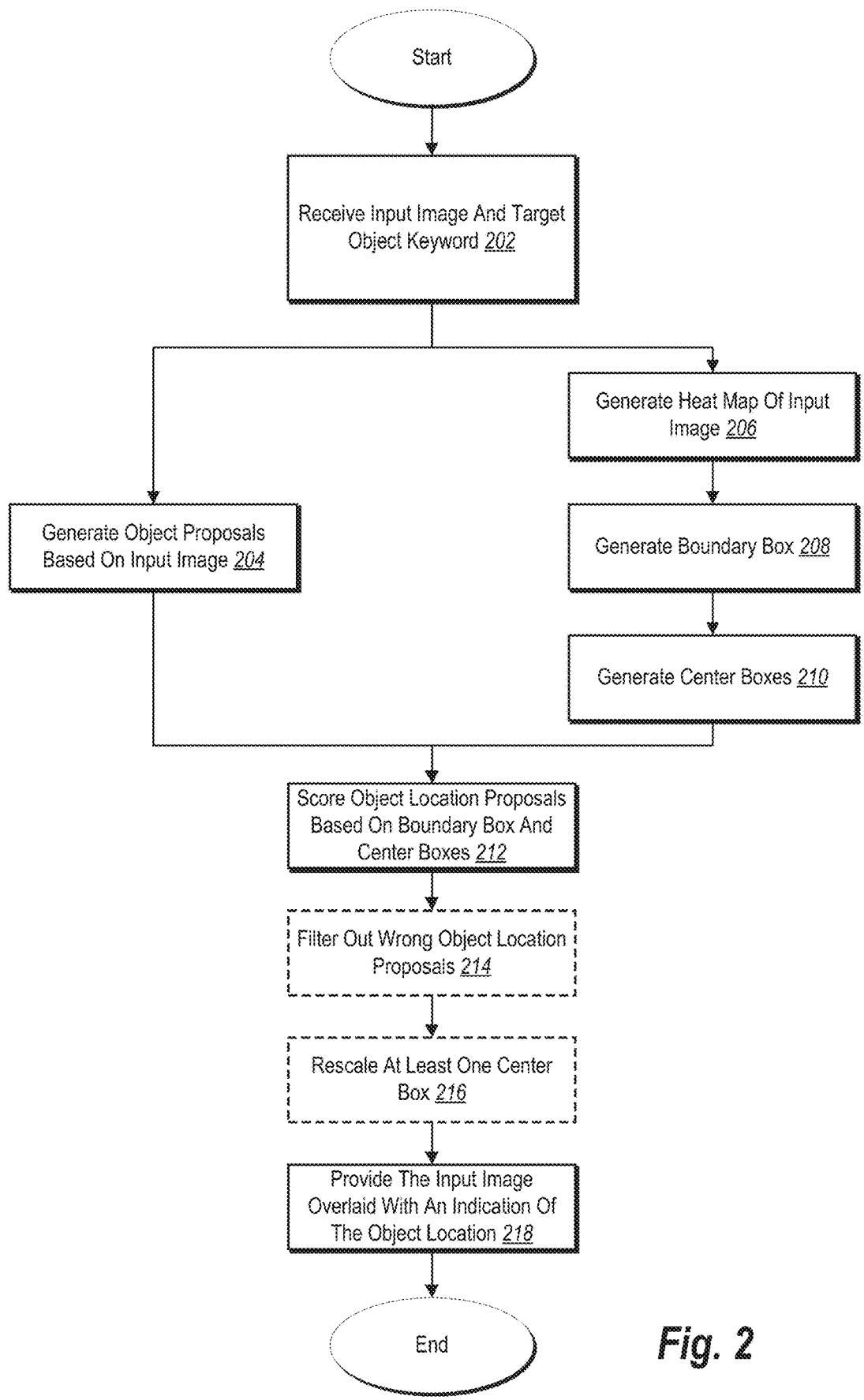
FIG. 2 illustrates a sequence diagram of steps of detecting an object in an input image in accordance with one or more embodiments.

FIG. 2 illustrates an overview of a sequence of acts by which the object detection system detects an object in a digital image based on received target object keyword. After providing an overview in connection with FIG. 2, additional detail regarding the process of objection detection by the object detection system is provided in connection with FIGS. 3-6. As shown in FIG. 2, the sequence of acts begins when the object detection system receives an input image and a target object keyword (202). As described with reference to FIGS. 1A and 1B, the object detection system can receive the input image and the target object keyword via the object detection graphical user interface 106. Additionally, or alternatively, the object detection system can receive the input image and the target object keyword via a native application interface (e.g., a mobile device app, a desktop program). Additionally, or alternatively, the object detection system can receive the input image and the target object keyword as part of an automatic batch process.

In response to receiving the input image and the target object keyword, the object detection system generates a heat map of the input image (206) based on the target object keyword. For example, the heat map is a graphical representation sharing the dimensions of the input image that indicates one or more regions in the input image that are associated with the target object keyword. In one or more embodiments, the object detection system generates the heat map of the input image (206) using a fully-convolutional dense tagging network. The object detection system provides the input image and the target object keyword as inputs to the fully-convolutional dense tagging network.

The fully-convolutional dense tagging network outputs a generated heat map that corresponds to the input image. For example, the fully-convolutional dense tagging network outputs the heat map such that the color intensity of each pixel or region in the heat map corresponds to the target object keyword. For instance, if the fully-convolutional dense tagging network determines that a particular region in the input image is associated with the target object keyword (i.e., an object corresponding to the target object keyword is likely located in that region in the input image), the fully-convolutional dense tagging network adds brighter pixels to the corresponding region in the heat map. The process by which the object detection system generates heat maps is discussed further below with reference to FIG. 3.

After generating the heat map of the input image (206), the object detection system generates various bounding boxes based on the generated heat map. In one or more embodiments, the object detection system first generates a boundary box (208) based on the generated heat map. In at least one embodiment, the object detection system generates the boundary box (208) by determining a global threshold in the heat map and identifying all pixels in the heat map with pixel values greater than the global threshold.

The object detection system then binarizes the heat map into pixels above the threshold and pixels below the threshold (e.g., converts the heat map to black and white). The object detection system then identifies a connected domain in the binarized heat map. Finally, the object detection system calculates a morphology convex of the connected domain and fits a minimum bounding rectangle to the calculated morphology convex. In one or more embodiments, the minimum bounding rectangle in the binarized heat map is the boundary box. The process by which the object detection system generates the boundary box (208) is described further below with reference to FIGS. 4A and 4B.

After generating the boundary box (208), the object detection system generates one or more center boxes (210) based on the generated heat map. For example, the object detection system generates the boundary box in step (208) that identifies a pixel region in the generated heat map where all pixels are above a global threshold. In one or more embodiments, the object detection system generates the one or more center boxes (210) in order to identify one or more pixel regions in the generated heat map where pixels are above a local threshold.

To generate the one or more center boxes (210), the object detection system identifies a local maximum in every row and column of the heat map. For example, the object detection system identifies a pixel in each row and column of the heat map that has a color value higher (e.g., is brighter) than that of all the other pixels in that row or column. In one or more embodiments, the object detection system then binarizes the heat map based on the identified pixels and identifies a connected domain for each grouping of white pixels. Finally, the object detection system calculates a morphology convex of each connected domain and fits a minimum bounding rectangle to each calculated morphology convex. In one or more embodiments, the resulting minimum bounding rectangles are the one or more center boxes. The process by which the object detection system generates the one or more center boxes (210) is described further below with reference to FIG. 5.

In one or more embodiments, the object detection system performs additional procedures in parallel or concurrently with the processes described in steps (206)—(210). For example, as shown in FIG. 2, the object detection system generates object location proposals based on the input image (204) in parallel with generating the heat map (206), the boundary box (208), and the center boxes (210). In at least one embodiment, the object detection system generates object location proposals (204) by utilizing the input image and the target object keyword in connection with one or more object detection methods. Although the step (204) is illustrated concurrently with the steps (206)—(210) in FIG. 2, in alternative embodiments, the object detection system can perform the step (204) prior to performing the steps (206)—(210) or following the steps (206)—(210).

In one or more embodiments, the object detection system generates object location proposals (204) utilizing at least two different methods. For example, in one embodiment, the object detection system generates object location proposals (204) utilizing a selective search method and a YOLO ("You Only Look Once") method. As an overview, the object detection system proposes regions, locations, or positions in an input image that are likely associated with a target object keyword. The object detection system begins by over-segmenting the input image based on a color-intensity of the pixels in the input image. The object detection system then iterates on the following steps: 1) add all bounding boxes corresponding to segmented parts of the input image to the list of object location proposals, 2) group adjacent segments based on similarity. The object detection system iterates steps 1 and 2 until the entire input image is included in a single bounding box. The object detection system measures similarity between adjacent segments based on color, texture, size, and shape compatibility. The selective search method used by the object detection system typically results in a large number of object location proposals.

As just mentioned, the object detection system can also utilize a YOLO method in generating object location proposals. As an overview, the YOLO ("You Only Look Once") method applies a single neural network to an input image. In particular, using the YOLO neural network, the object detection system divides the input image into regions and predicts bounding boxes within the input image and probabilities associated with each region. The object detection system weights each predicted bounding box based on the probability that an object associated with the target object keyword is located in the same region as the predicted bounding box. The object detection system outputs the predicted bounding boxes with the heaviest weights as object location proposals.

In one or more embodiments, the object detection system can utilize additional object detection methods in generating object location proposals (204). Alternatively, the object detection system may only utilize a single object detection method in generating object location proposals (204). In at least one embodiment, the object detection system adds additional weight to object location proposals generated by a particular method. For example, the object detection system may add additional weight to object location proposals generated by the YOLO method, while leaving the object location proposals generated by the selective search method unweighted.

Returning to FIG. 2, at the conclusion of steps (204) and (210), the object detection system scores the object proposals based on the boundary box and the center boxes (212). In one or more embodiments, the object detection system scores an object proposal largely based on an amount of overlap between the object proposal and the boundary box, and on an amount of overlap between the object proposal and at least one center box.

After determining a score for each object location proposal, the object detection system filters out wrong object location proposals (214). In one or more embodiments, the object detection system filters out wrong object location proposals (214) based on the scores determined in step (212). For example, in at least one embodiment, the object detection system identifies a maximum score among the scores determined for the object location proposals and filters out object location proposals with scores lower than a threshold amount (e.g., 70%) of the maximum score. Additionally, the object detection system further filters the remaining object location proposals by filtering out object location proposals that are in the same position (e.g., object location proposals with an overlap>=0.8). The object detection system can further filter the remaining object location proposals by identifying any remaining object location proposals that are not covered well (e.g., overlap<=0.8) by the boundary box, and by identifying any remaining object location proposals that fail to cover at least one center box well.

In at least one embodiment, the filtering process in step (214) may result in the object detection system filtering out all of the generated object location proposals. If no object location proposals remain after the filtering process, the object detection system can rescale at least one of the one or more center boxes (216) and provide the rescaled at least one center box as an indication of an object location associated with the target object keyword. If all the generated object location proposals are filtered out, the object detection system rescales the at least one center box to enlarge the at least one center box. For example, the object detection system enlarges the largest of the one or more center boxes by recalculating the corner coordinates of the largest center box such that the resulting rescaled center box is a threshold percentage larger (e.g., 50% larger).

After determining either the top scoring object location proposals or the rescaled at least one center box, the object detection system provides the input image overlaid with an indication of the object location (218). For example, in response to determining a top scoring object location proposal or a rescaled center box, the object detection system overlays the input image with a bounding box that has corners at the same coordinates as the corner coordinates of the top scoring object location proposal or rescaled center box. In one or more embodiments, the object detection system adds a color or line pattern to the overlaid bounding box in order to make the overlaid bounding box more easily seen against the input image.

The object detection system can provide the input image overlaid with the indication of the object location (218) to a client device (e.g., via a web page, via a native application display). Alternatively, the object detection system can provide the input image overlaid with the indication of the object location (218) to a repository of other input images overlaid with indications of the object location as part of a batch process involving a large number of additional input images. Alternatively, the object detection system can build a database including a unique identifier associated with the input image and the corner coordinates of the indication of the object location as part of a batch process involving a large number of additional input images.

Figure 3:
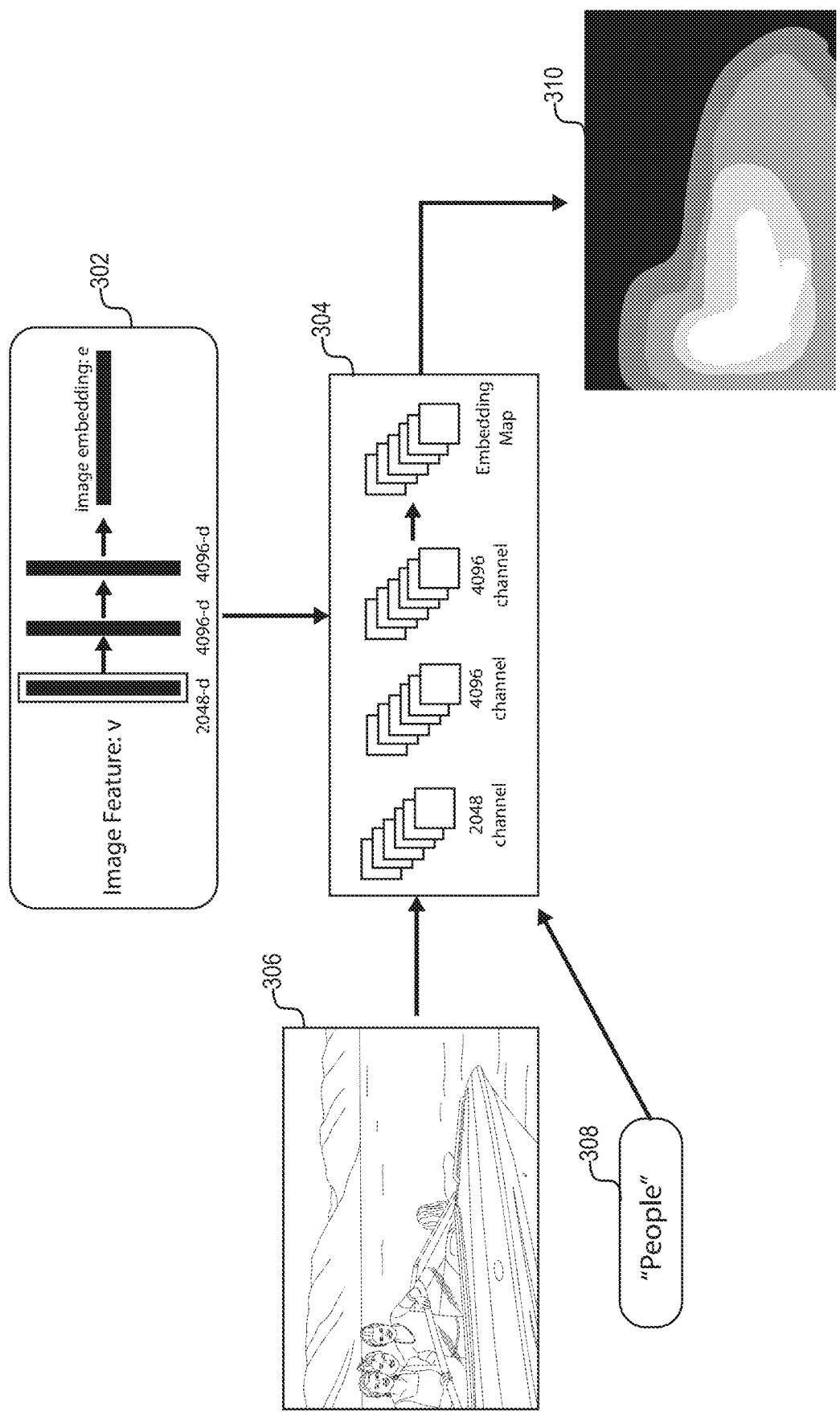
FIG. 3 illustrates an overview of generating a heat map in accordance with one or more embodiments.

FIG. 3 illustrates the process by which the object detection system generates a heat map based on an input image and a target object keyword. For example, as mentioned above and as shown in FIG. 3, the object detection system can generate a heat map 310a by first transforming an embedding neural network 302 to a fully-convolutional dense tagging neural network 304.

As an initial step, to train the embedding neural network 302, the object detection system uses a training set of images. The training set of imagers comprises images and associated tags. The object detection system can use a word vector representation to exploit a tag correlation. The embedding neural network 302 is learned to map an image to an embedding space as e=embed_net(I), wherein $e \in \varepsilon = \mathbb{R}^D$ with dimension D. Then the object detection system measures a similarity score between an image I and a word vector representation of a tag w in this space by:

$$f_{embed}(I, w) = \langle \text{embed\_net}(I), w \rangle$$
$$= \langle e, w \rangle$$
$$= \frac{e^T w}{\|e\|\|w\|},$$

The object detection system uses a pointwise mutual information word vector as a tag representation. Pointwise mutual information is a measure of association given as:

$$M = PMI(w_i, w_j) = \frac{\log p(w_i, w_j)}{\log p(w_i) \log p(w_j)}$$

The matrix M is of size V×V, where V is a size of a tag dictionary W and M accounts for the co-occurrences of tags in the training corpus. The object detection system applies Eigen vector decomposition to decompose the matrix M as $M=USU^T$. Where $W=US^{-1/2}$ then each row of the column-truncated submatrix is used as the word vector representation for all V tags. In practice, the object detection system sets D to 4096.

After obtaining word vector representation for each tag, the object detection system uses an encoding scheme for user provided tags of an image. The object detection system forms a soft topic t as a weighted average of the bag of word vectors:

$$t = \sum_{i=1}^{n} \alpha_i w_i$$

This encoding scheme is a "soft topic" since t is a coarse summary of the tag list and resides in a continuous word vector space. The object detection system can use the soft topic to discover a dominant concept in the tag list so that it's robust to "noisy" annotations. Furthermore, although each image in the dataset is labeled with a lot of tags, the list tag is annotated with respect to the whole image and no bounding box annotation is available for each tag. Thus, a tag-specific embedding approach is not directly implemented.

A neural net is employed to map the image and tag list into the common embedding space ε. More specifically, the object detection system passes each image I through a Resnet. The object detection system extracts the penultimate layer and uses it as a visual feature v. In order to train the embedding neural network 302, the object detection system uses a cosine similarly loss to compare the visual embedding e and the soft topic t. For example, the object detection system can use the cosine similarity loss:

$$\text{embed\_loss}(e, t) = 1 - \langle e, t \rangle$$
$$= 1 - \frac{e^T t}{\|e\|\|t\|}$$

Once trained, the embedding neural network 302 maps images and associated tag lists into a common embedding space. Accordingly, the embedding neural network 302 is a three-layer fully-connected neural network with each fully-connected layer followed by a batch normalization layer and a rectified linear unit ("ReLU") non-linear activation layer.

In order to transform the embedding neural network 302 to the fully-convolutional dense tagging neural network 304, the object detection system utilizes the fully connected weights in the embedding neural network 302 as 1×1 convolutional kernels in the fully-convolutional dense tagging neural network 304. The object detection system further utilizes the batch normalization layers in the embedding neural network 302 as spatial batch normalization layers in the fully-convolutional dense tagging neural network 304. To further illustrate, in one or more embodiments, a fully-connected layer, as in the embedding neural network 302, includes a linear operation where every input to the fully-connected layer is connected to every output from the fully-connected layer by a weight. In one or more embodiments, a convolutional layer, as in the fully-convolutional dense tagging neural network 304, utilizes a subset of the weights of a dense layer where nearby inputs are connected to nearby outputs and the weights for the convolutions at each location are shared.

After this transformation, as shown in FIG. 3, in response to receiving the input image 306 and the target object keyword 308, the fully-convolutional dense tagging neural network 304 outputs the heat map 310a.

In one or more embodiments, the heat map 310a includes the same dimensions as the input image 306. Furthermore, the heat map 310a includes a matrix of pixels where each pixel is colored to represent specific data. In at least one embodiment, the data represented by the color of a pixel in the heat map 310a is a likelihood of whether a region in the input image that corresponds to the position of the pixel in the heat map is associated with the target object keyword 308. As shown in FIG. 3, the fully-convolutional dense tagging neural network 304 colors the pixels in the heat map 310a such that the color of a pixel increases in intensity (e.g., becomes brighter) as that likelihood increases. The result is that the lighter areas in the heat map 310a are more likely to correspond to regions in the input image 306 that are associated with the target object keyword 308.

The acts and algorithms discussed above in relation to FIG. 3, in one or more embodiments, can comprise the corresponding structure for performing a step for generating a heat map of an input image based on a target object keyword.

FIG. 4A illustrates how the object detection system generates a boundary box based on the heat map 310a. In one or more embodiments, the object detection system first determines a global threshold based on the entire heat map 310a. In at least one embodiment, the object detection system determines the global threshold utilizing the triangle method. For example, the object detection system generates a histogram representing the brightness level of the pixels in the heat map 310a, with the number pixels along the y-axis and the brightness (e.g., in RGB values) along the x-axis. The object detection system then adds a line to the histogram between the maximum of the histogram at the brightest point and the minimum of the histogram at the least bright point. Following this, the object detection system identifies a distance between the added line and the histogram for all brightness values along the x-axis. The object detection system identifies the global threshold as the brightness value on the x-axis where the distance between the histogram and the line is maximal. In additional or alternative embodiments, the object detection system may utilize other methods in identifying a global threshold (e.g., the isodata algorithm, the background symmetry algorithm). Alternatively, the object detection system may utilize a static global threshold that is predefined.

In one or more embodiments, the global threshold represents a particular pixel color value. For example, as described above, the pixels in the heat map 310 each include an RGB color value (e.g., a "Red Green Blue" color value) where the color absolute black is represented as "(0,0,0)," the color absolute white is represented as "(255,255,255)," and all other colors are represented by RGB values in-between absolute black and absolute white. Accordingly, the global threshold represents a color with a specific brightness level in-between absolute black and absolute white.

In order to identify all pixels in the heat map with pixel color values greater than the identified global threshold, the object detection system creates a copy of the heat map 310a' and compares each pixel's color value in the copy of the heat map 310a' against the identified global threshold. If a pixel's color value is at least as bright as the global threshold (e.g., the pixel's RGB value is at least as great as the RGB value of the global threshold), the object detection system converts the color value of the pixel in the copy of the heat map 310a' to absolute white (e.g., "(255,255,255)"). If the pixel's color value is darker than the global threshold (e.g., the pixel's RGB value is less than the RGB value of the global threshold), the object detection system converts the color value of the pixel in the copy of the heat map 310a' to absolute black (e.g., "(0,0,0,)"). The object detection system continues this process until the copy of the heat map 310a' is binarized into black and white with each pixel converted to either absolute white or absolute black. As shown in FIG. 4A, the resulting binarized image 312a in the copy of the heat map 310a' is black and white, and the white region of the binarized image 312a represents the regions of the heat map 310a that included pixels with color values at or above the global threshold.

In one or more embodiments, the process of creating the binarized image 312a may not result in a connected domain. For example, a connected domain is a closed curve that can be shrunk to a point continuously in the set. In other words, a connected domain is a closed shape that does not include any holes. In at least one embodiment, and in response to determining that the white region of the binarized image 312a is not a connected domain, the object detection system can transform the white region to a connected domain. For instance, the object detection system can convert black pixels in the binarized image 312a to white pixels in order to close a curve along the white region. Additionally, the object detection system can convert black pixels that are isolated within the white region in the binarized image 312a in order to close any existing holes within the binarized image 312a.

In addition to transforming the binarized image 312a to a connected domain, the object detection system can perform additional morphological functions in connection with the binarized image 312a in order to generate an optimal boundary box. For example, the object detection system can calculate the morphology convex of the connected domain. In one or more embodiments, the convexity of a shape (e.g., the white region of the binarized image 312a) refers to, for every pair of points in the shape, how well every point on the straight-line segment that joins the pair of points remains within the shape. Put another way, a shape with poor convexity is not well-rounded. In at least one embodiment, the object detection system can calculate the morphology convex of the connected domain by transforming areas of the white region of the binarized image 312a to include a more rounded perimeter shape (e.g., a convex "hull").

After calculating the morphology convex of the connected domain in the binarized image 312a, the object detection system generates the boundary box. For example, in one or more embodiments, the object detection system generates the boundary box 314a by fitting a minimum bounding rectangle to the transformed white region (e.g., the calculated morphology convex) in the binarized image 312a. In at least one embodiment, the object detection system stores the generated boundary box 314a as a set of corner coordinates (e.g., "(x, y, width, height)") relative to the copy of the heat map 310a'.

FIG. 4A illustrates the object detection system generating a boundary box 314a in connection with a relatively basic heat map (e.g., the heat map 310a). For example, as shown in FIG. 4A, the heat map 310a includes a single "hot spot" indicating a single location in a corresponding input image that is associated with a target object keyword. In additional embodiments, the object detection system can generate a boundary box in connection with a more complex heat map.

For example, FIG. 4B illustrates the object detection system generating the boundary box 314b based on the heat map 310b. As shown in FIG. 4B, the heat map 310b includes multiple "hot spots" indicating multiple locations in the corresponding input image that are associated with a target object keyword. To illustrate, the corresponding input image may be a photograph of multiple family members sitting and standing loosely in a group and the target object keyword may be "people."

In the embodiment illustrated in FIG. 4B, the object detection system can determine the global threshold for the heat map 310b utilizing any of the methods described above relative to FIG. 4A. Similarly, the object detection system can binarize the copy of the heat map 310b' by comparing each pixel's color value in the copy of the heat map 310b' against the identified global threshold. Because of the multiple "hot spots" in the heat map 310b, it is possible that the resulting binarized image 312b includes a non-connected domain. Accordingly, as described above and as shown in FIG. 4B, the object detection system can transform the white region of the copy of the heat map 310b' to a connected domain. Additionally, the object detection system can calculate the morphology convex of the connected domain in the binarized image 312b to achieve a rounded perimeter shape. Finally, as described above, the object detection system fits a minimum bounding box to the white areas of the binarized image 312b to generate the boundary box 314b.

FIG. 5A illustrates the process by which the object detection system generates one or more center boxes based on the heat map 310A. In one or more embodiments, the object detection system begins by determining local thresholds within a second copy of the heat map 310a". For example, as shown in FIG. 5A, the object detection system determines local thresholds by identifying the brightest pixel (e.g., the pixel with the brightest RGB color value) in every row and in every column in the second copy of the heat map 310a". In response to identifying the brightest pixel in every row and in column of the second copy of the heat map 310a", the object detection system converts that pixel to absolute white and converts the remaining pixels in that row or column to absolute black.

As shown in FIG. 5A, the resulting binarized image 312a includes a white region and black region. In one or more embodiments, the local thresholds are more precise than the global threshold discussed above. Accordingly, the white region generated in response to a local threshold is typically smaller than the white region generated in response to a global threshold.

After generating the binarized image 312a from the second copy of the heat map 310a", the object detection system transforms each white region in the binarized image 312a into a connected domain, as described above with reference to FIGS. 4A-4B. Moreover, in the same process described above with reference to FIGS. 4A-4B, the object detection system calculates the morphology convex of each connected domain in the binarized image 312a. Finally, the object detection system fits a minimum bounding rectangle to each transformed white region in the second copy of the heat map 310a" in order to generate the center box 316a.

As mentioned above, it is possible that the object detection system may generate two or more center boxes based on a heat map. For example, as discussed above with reference to the heat map 310b, an input image may include several objects that correspond to a target object keyword. It follows that the heat map associated with that input image may include several "hot spots" or regions associated with the target object keyword.

FIG. 5B illustrates two or more center boxes. For example, the object detection system determines local thresholds by identifying the brightest pixel in every row and in every column in the second copy of the heat map 310b". In response to identifying the brightest pixel in every row and in column of the second copy of the heat map 310b", the object detection system converts that pixel to absolute white and converts the remaining pixels in that row or column to absolute black. After generating the binarized image 312b from the second copy of the heat map 310b", the object detection system transforms each white region in the binarized image 312b into a connected domain, and then calculates the morphology convex if each connected domain in the binarized image 312b. Finally, the object detection system fits a minimum bounding rectangle to each transformed white region in the second copy of the heat map 310b" in order to generate the center boxes 316b, 310c, and 310d.

Figure 6:
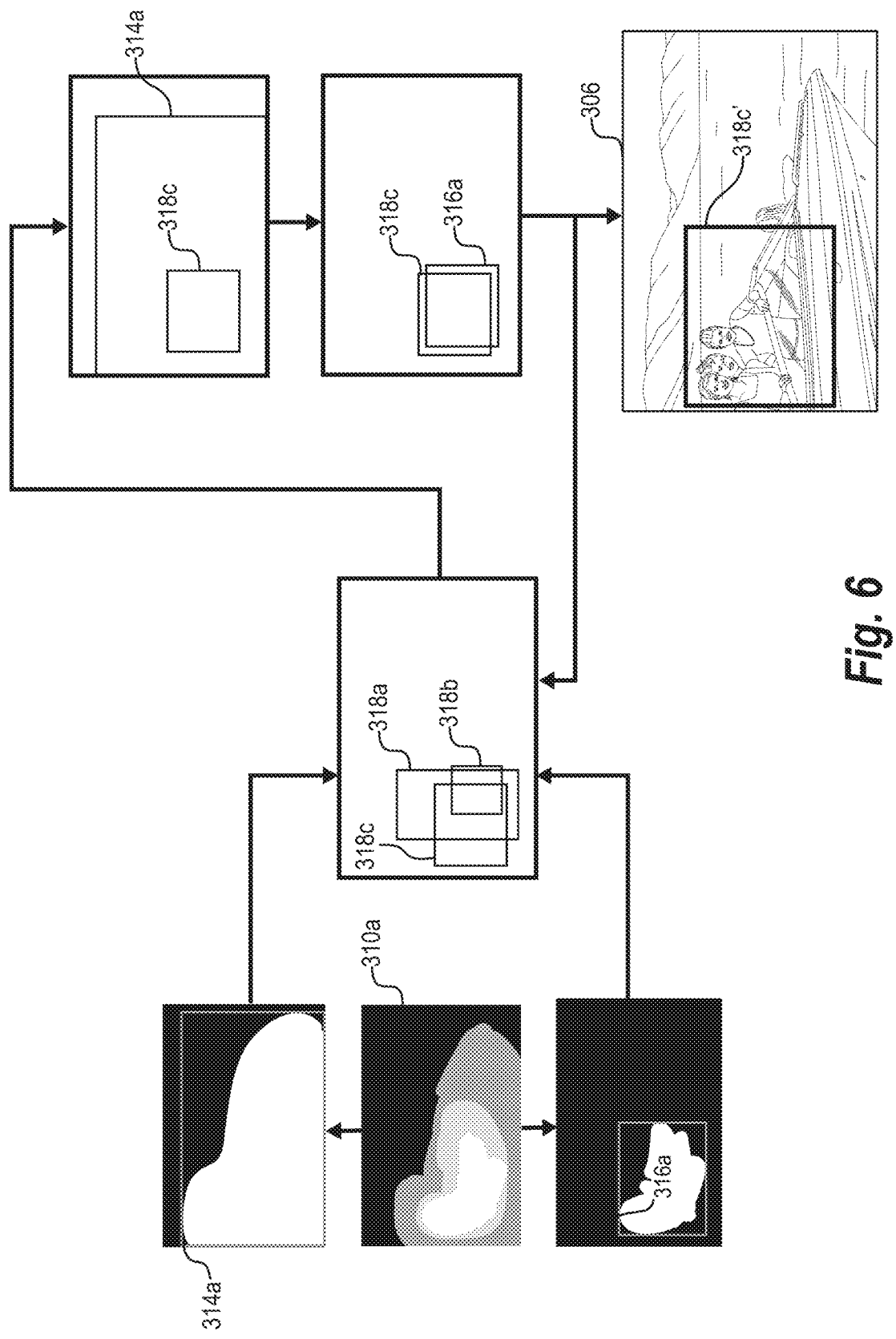
FIG. 6 illustrates an overview of the process of utilizing a heat map, a boundary box, and one or more center boxes to detect an object in an input image in accordance with one or more embodiments.

After generating a bounding box and one or more center boxes associated with a heat map, as described above with reference to FIGS. 4A-5B, the object detection system utilizes the generated bounding and center boxes to score and rank object location proposals. For example, FIG. 6 illustrates the object detection system scoring object location proposals based on the heat map 310a (e.g., from the embodiment illustrated in FIGS. 4A and 5A). As shown in FIG. 6, the object detection system scores and selects object location proposals based on the boundary box 314a, the heat map 310a, and the center box 316a. As discussed above, the digital media management scores an object location proposal largely based on an amount of overlap between object location proposal and the boundary box and each of the one or more center boxes.

For example, in at least one embodiment, the object detection system determines a score for an object location proposal according to the following proposal scoring algorithm:

$$s_p = w_a * s_a + w_b * s_b + w_c * s_c$$

where: $s_a$ is the mean pixel color value in the object location proposal (e.g., the mean pixel color value illustrates the relevancy of the object location proposal); $s_b$ is a score based on an amount of overlap between the object location proposal and generated boundary box; $s_c$ is the relevancy of the object location proposal with the at least one center box; and $w_a$, $w_b$, and $w_c$ are weights assigned by the object detection system to $s_a$, $s_b$, and $s_c$, respectively.

For instance, after receiving the object location proposals 318a, 318b, 318c (e.g., from a YOLO net or selective search described above), the object detection system can iteratively score each object location proposal 318a-318c utilizing the proposal scoring algorithm. For instance, in order for the object detection system to calculate the proposal scoring algorithm for the object location proposal 318c, the object detection system can determine the mean pixel color value of the object location proposal 318c (e.g., $s_a$), and the amount of overlap between the object location proposal and the boundary box 314a (e.g., $s_b$).

In one or more embodiments, the object detection system determines $s_b$ (e.g., the score based on the amount of overlap between the object location proposal and the generated boundary box) based on a number of overlapping pixels between the object location proposal 318c and the generated boundary box 314a. In that embodiment, the score may be the number of overlapping pixels. Alternatively, the object detection system may calculate $s_b$ by determining a percentage of the generated boundary box 314a that is overlapped by the object location proposal 318c.

In order to determine the relevancy of the object location proposal 318c with the at least one center box (e.g., $s_c$), the object detection system utilizes the following relevancy of current proposal algorithm for the center box 316a:

$$s_c = w_{iou} * s_{iou} + w_{overlap(c,p)} * s_{overlap(c,p)} + w_{overlap(p,c)} * s_{overlap(p,c)}$$

where: $s_{iou}$ is a score based on an intersection over union between the center box 316a and the object location proposal 318c; $s_{overlap(c,p)}$ is a score based on an amount of overlap between the center box 316a and the object location proposal 318c; $s_{overlap(p,c)}$ is a score based on an amount of overlap between the object location proposal 318c and the center box 316a; and $w_{iou}$, $w_{overlap(c,p)}$, and $w_{overlap(p,c)}$ are weights assigned by the object detection system to $s_{iou}$, $s_{overlap(c,p)}$, and $s_{overlap(p,c)}$, respectively.

If there are two or more center boxes (e.g., as with FIG. 5B above), the object detection system can determine the relevancy of the object location proposal 318c against each of the two or more center boxes. The object detection system then utilizes the proposal scoring heuristic for each generated center box in order to find the highest score $s_p$ for the object location proposal. The object detection system then assigns that highest score $s_p$ to the object location proposal. If there are multiple object location proposals (e.g., the object location proposals 318a, 318b), the object detection system repeats the utilizing of the proposal scoring heuristic with each additional object location proposal. The algorithms discussed above, in one or more embodiments, can comprise the corresponding structure for performing a step for determining a score for each of the determined one or more object location proposals in the input image.

After determining a score (e.g., $s_p$) for each object location proposal 318a-318c, the object detection system filters out wrong object location proposals as discussed above. In one or more embodiments, the object detection system outputs one or more object location proposals (e.g., either the top scoring object location proposals remaining after the filtering process or the rescaled at least one center box) as coordinate listings. For example, the object detection system can output each object location proposal in the following format:

$$coord_{bbox} = \left(\frac{c_{min}}{\text{width}}, \frac{r_{min}}{\text{height}}, \frac{c_{max}}{\text{width}}, \frac{r_{max}}{\text{height}}\right)$$

After determining either the top scoring object location proposals or the rescaled at least one center box, the object detection system provides the input image overlaid with an indication of the object location. For example, in response to determining a top scoring object location proposal or a rescaled center box, the object detection system overlays the input image with a bounding box that has corners at the same coordinates as the corner coordinates of the top scoring object location proposal or rescaled center box. In one or more embodiments, the object detection system adds a color or line pattern to the overlaid bounding box in order to make the overlaid bounding box more easily seen against the input image.

In particular, with reference to FIG. 6, in response to identifying a highest scoring object location proposal (e.g., the object location proposal 318c), the object detection system provides the input image 306 overlaid with an indication 318c' of an object location associated with the target object keyword. For example, as mentioned above, the heat map (e.g., the heat map 310a) and copies of the heat map (e.g., the copies 310a', 310a") share the same dimensions as the input image 306. Accordingly, any object location proposals, boundary boxes, and center boxes that the object detection system generates based on the input image or heat map are associated with corner coordinates that refer to the same regions across the input image and heat map. Thus, as shown in FIG. 6, the indication 318c' of the object location associated with the target object keyword is a bounding box that shares coordinates with the highest scoring object location proposal (e.g., the object location proposal 310c). In additional or alternative embodiments, the object detection system can generate the indication 318c' to include various colors or line patterns. Additionally, in at least one embodiment, the object detection system can analyze the input image 306 to identify a contrasting color and can apply the contrasting color to the indication 318c' in order to make the indication 318c' stand out against the input image 306.

Figure 7:
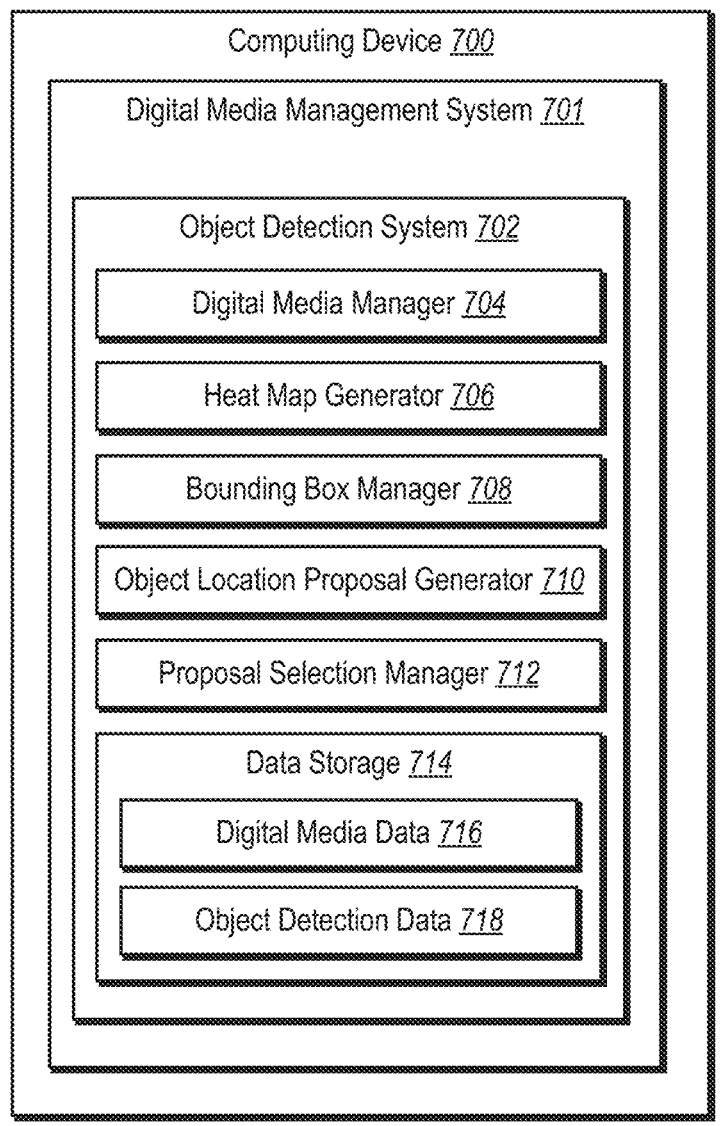
FIG. 7 illustrates a schematic diagram of an object detection system including an object detection system in accordance with one or more embodiments.

Referring now to FIG. 7, additional detail will be provided regarding capabilities and components of the object detection system in accordance with one or more embodiments. In particular, FIG. 7 shows a schematic diagram of an example architecture of the object detection system 702 as part of a digital media management system 701 and implemented on a computing device 700. The object detection system 702 can represent one or more embodiments of the object detection system described previously.

As shown, the object detection system 702 is located on or implemented by a computing device 700. In general, the computing device 700 may represent various types of client devices. For example, in some embodiments, the computing device 700 is a mobile device, such as a laptop, a tablet, a mobile telephone, a smartphone, etc. In other embodiments, the computing device 700 is a non-mobile device, such as a desktop or server, or another type of computing device. Additional details with regard to the computing device 700 are discussed below as well as with respect to FIG. 10.

The digital media management system 701, in general, facilitates the creation, modification, sharing, and/or deletion of digital images within electronic documents and/or system applications. For example, the digital media management system 701 provides a variety of tools on the computing device 700 related to image creating and editing (e.g., photo-editing). In addition, the digital media management system 701 can access additional locally or remotely stored repositories of images. For example, in one or more embodiments, the digital media management system 701 operates in connection with digital applications such as ADOBE® CREATIVE CLOUD®. "ADOBE" and "CREATIVE CLOUD" are either registered trademarks or trademarks of Adobe Systems Incorporated in the United States and/or other countries.

As shown in FIG. 7, the object detection system 702 includes a digital media manager 704, a heat map generator 706, a bounding box manager 708, an object location proposal generator 710, a proposal selection manager 712, and a data storage 714 including digital media data 716 and object detection data 718.

In one or more embodiments, the components of the object detection system 702 comprise software, hardware, or both. For example, the components of the object detection system 702 can comprise computing instructions stored on a non-transitory computer-readable storage medium and executable by at least one processor of the computing device 700. When executed by the at least one processor, the computer-executable instructions cause the computing device 700 to perform the methods and processes described herein. Alternatively, the components of the object detection system can comprise hardware, such as a special purpose processing device to perform a certain function or group of functions. Additionally, the components of the object detection system 702 can comprise a combination of computer-executable instructions and hardware.

As shown in FIG. 7, the object detection system 702 includes the digital media manager 704. In at least one embodiment, the digital media manager 704 provides access to digital media items (e.g., digital photographs, digital videos) via cloud storage, via a social media system, or via local storage. Further, the digital media manager 704 enables a user of the computing device 700 to view and edit digital media items. Additionally, in at least one embodiment, the digital media manager 704 enables the user of the computing device 700 to engage in social media activities relative to one or more digital media items (e.g., comment on a post including a digital photograph). Moreover, in one or more embodiments, the digital media manager 704 sends and receives digital media items (e.g., input images, target object keywords), information associated with digital media items (e.g., editing information, social media activity information), and other information utilized by the object detection system 702 (e.g., indications of object locations in input images).

Also, as shown in FIG. 7, the object detection system 702 includes the heat map generator 706. In one or more embodiments, the heat map generator 706 transforms an embedding neural network to a fully-convolutional dense tagging neural network, as described above. Furthermore, the heat map generator 706 provides an input image and a target object keyword as input into the fully-convolutional dense tagging neural network and receives as output a heat map based on the input image and the target object keyword, also as described above.

In one or more embodiments, the heat map generator 706 includes various functionalities to handle exceptional cases. For example, in at least one embodiment, the fully-convolutional dense tagging neural network is not accurate in detecting objects associated with human categories (e.g., because all humans share the same basic body shapes, facial components). Thus, in order to increase the accuracy of object detection associated with the target object keywords, "man," "woman," and "child," and so forth, the heat map generator 706 can temporarily convert any of those target object keywords to the target object keyword, "people." The heat map generator 706 then generates a heat map of the input image based on the target object keyword, "people." The heat map generator 706 can also provide the object location proposal generator 710, as described below, with the target object keyword, "people," such that the generated object location proposals are associated with "people."

As further shown in FIG. 7, the object detection system 702 includes the bounding box manager 708. In one or more embodiments, the bounding box manager 708 generates a boundary box based on a heat map generated by the heat map generator 706. For example, as discussed above, the bounding box manager 708 generates a boundary box based on a heat map by determining a global threshold for the heat map, binarizing the heat map based on the global threshold, getting the connected domain of the binarized heat map, calculating the morphology convex of the connected domain, and fitting a minimum bounding rectangle to the morphology convex. In at least one embodiment, the bounding box manager 708 stores the resulting boundary box as a set of coordinates relative to the heat map and the corresponding input image.

Additionally, the bounding box manager 708 generates one or more center boxes based on the heat map generated by the heat map generator 706. For example, as discussed above, the bounding box manager 708 generates the one or more center boxes by identifying a local maximum pixel color value in each row and column in the heat map, binarizing the heat map based on the identified local maximum pixel color values, getting the connected domain of the binarized image, calculating the morphology convex of the connected domain, and then fitting a minimum bounding rectangle to each calculated morphology convex. In at least one embodiment, the bounding box manager 708 stores the resulting one or more center boxes as sets of coordinates relative to the heat map and the corresponding input image.

Also, as shown in FIG. 7, the object detection system 702 includes the object location proposal generator 710. For example, as discussed above, the object location proposal generator 710 generates object location proposals based on the input image and the target object keyword. Also, as discussed above, the object location proposal generator 710 generates object location proposals utilizing various methods such as the selective search method and the YOLO net method.

Additionally, shown in FIG. 7, the object detection system 702 includes the proposal selection manager 712. In one or more embodiments, the proposal selection manager 712 determines scores for each of the object location proposals generated by the object location proposal generator 710 based on the boundary box and one or more center boxes. For example, the proposal selection manager 712 determines scores for each of the object location proposals utilizing Equation 1 and Equation 2, discussed above.

In one or more embodiments, the proposal selection manager 712 filters out bad object location proposals based on the determined scores. For example, in at least one embodiment, the proposal selection manager 712 filters out object location proposals with scores lower than a threshold percentage (e.g., 70%) of a maximum score. Additionally, in at least one embodiment, the proposal selection manager 712 further filters out object location proposals that overlap beyond a threshold amount with high-scoring object location proposals. Furthermore, in at least one embodiment, the proposal selection manager 712 further filters out object location proposals that are not well-covered by the boundary box and at least one of the one or more center boxes.

In one or more embodiments, the proposal selection manager 712 also determines whether any object location proposals remain after the filtering process. In at least one embodiment, and in response to determining that no object location proposals remain after the filtering process, the proposal selection manager 712 resizes one of the at least one center boxes. For example, the proposal selection manager 712 resizes the largest of the one or more center boxes by a threshold percentage (e.g., enlarges the largest center box by 50%).

Furthermore, in one or more embodiments, the proposal selection manager 712 provides the input image overlaid with an indication of an object location associated with the target object keyword. For example, the proposal selection manager 712 generates the indication as a rectangle with a size corresponding to the size of the highest scoring object location proposal. The proposal selection manager 712 then overlays the generated indication at corner coordinates in the input image that correspond to the corner coordinates of the highest scoring object location proposal.

In at least one embodiment, the proposal selection manager 712 clusters input images based on detected locations of an object associated with the target object keyword. For example, if the object detection system 702 is operating in batch-mode and detecting object locations across a large dataset of input images, the object detection system 702 can detect the corresponding object in each of the input images regardless of where the object is located within the input image. Accordingly, the proposal selection manager 712 can analyze the size and location of the detected object within each input image in order to cluster the input images based on the detected object. Thus, for example, the proposal selection manager 712 may provide only input images where the object is detected in the lower left-hand corner of the input image.

As further illustrated in FIG. 7, the object detection system 702 includes the data storage 714 including the digital media data 716 and the object detection data 718. In one or more embodiments, the digital media data 716 includes digital media information, such as a repository of input images. In one or more embodiments, the object detection data 718 includes object detection information, such as an embedding neural network, a fully-convolutional dense tagging neural network, generated heat maps, boundary boxes, center boxes, and indications of object locations.

Figure 8:
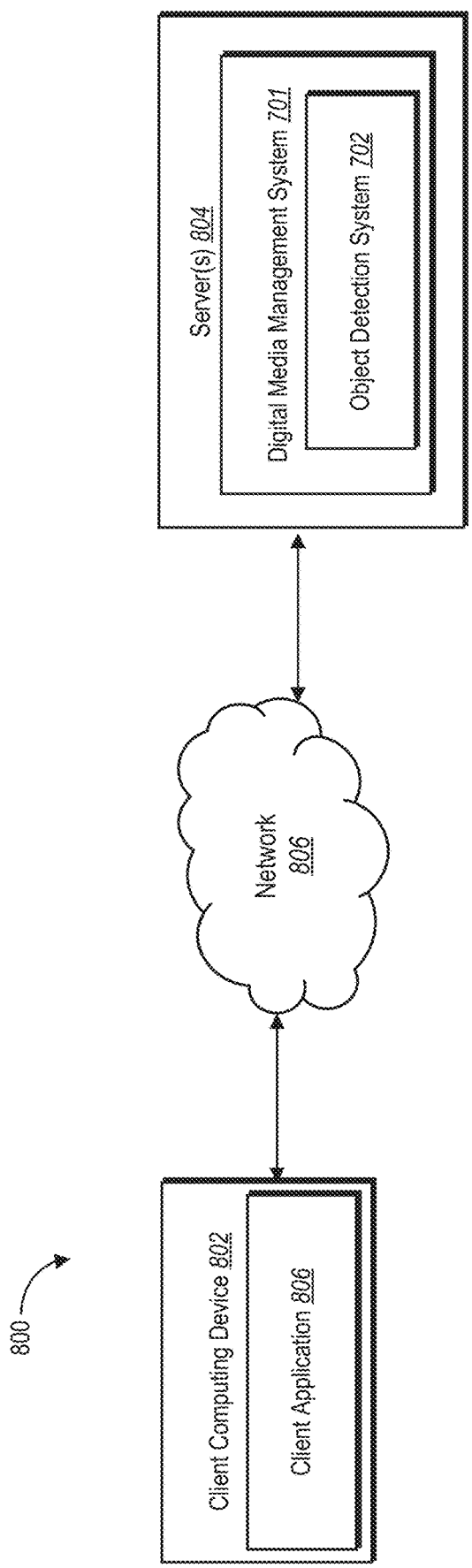
FIG. 8 illustrates an example environment in which the object detection system operates in accordance with one or more embodiments.

FIG. 8 illustrates an example environment 800 in which the object detection system 702 can operate. As illustrated in FIG. 8, the environment 800 includes a client-computing device 802 having a client application 806. Furthermore, in one or more embodiments, the environment 800 also includes the network 806 that connects the client computing device 802 and the server(s) 804 to each other and provides for the exchange of data there between. FIG. 8 also shows server(s) 804 can host the digital media management system 701 and the object detection system 702. In such configurations, the client application 806 can comprise an application that communicates with the object detection system 702 hosted by the server(s) 804. For example, the client application 806 can comprise a web browser or a native software application. The client-computing device 806 can send a request to the object detection system 702 hosted by the server(s) 804 to identify an object corresponding to a target object keyword in an image or set of images. The object detection system 702 can then identify objects in the image(s) that correspond to the target object keyword as described above. The object detection system 702 can then download the images and the identified objects to the client-computing device 802 in response to the request.

Alternatively, the object detection system 702 can include some components that operate on the client computing device 802 and other components that operate on the server(s) 804. Still further, the object detection system 702 may be installed as a native application, a web browser plugin, or another type of application plugin (e.g., a social media application plugin) on the client computing device 802.

The client computing device 802 may include a computing device such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. The client computing device 802 may enable a user of the client computing device 802 to access the network 806. The client computing device 802 may enable its user to communicate with other users at other client computing devices.

In one or more embodiments, the server(s) 804 may be capable of linking a variety of entities. As an example, and not by way of limitation, the server(s) 804 may enable users to interact with each other as well as receive content from third-party systems or other entities, or to allow users to interact with these entities through an application programming interfaces (API) or other communication channels.

In one or more embodiments, the servers 804 may include a variety of servers, sub-systems, programs, modules, logs, and data stores. In particular embodiments, the server(s) 804 may include one or more of the following: a web server, action logger, API-request server, relevance-and-ranking engine, content-object classifier, notification controller, action log, third-party-content-object-exposure log, inference module, authorization or privacy server, search module, advertisement-targeting module, user-interface module, user-profile store, connection store, third-party content store, or location store. The server(s) 804 may also include suitable components such as network interfaces, security mechanisms, load balancers, failover servers, management-and-network-operations consoles, other suitable components, or any suitable combination thereof.

Figure 9:
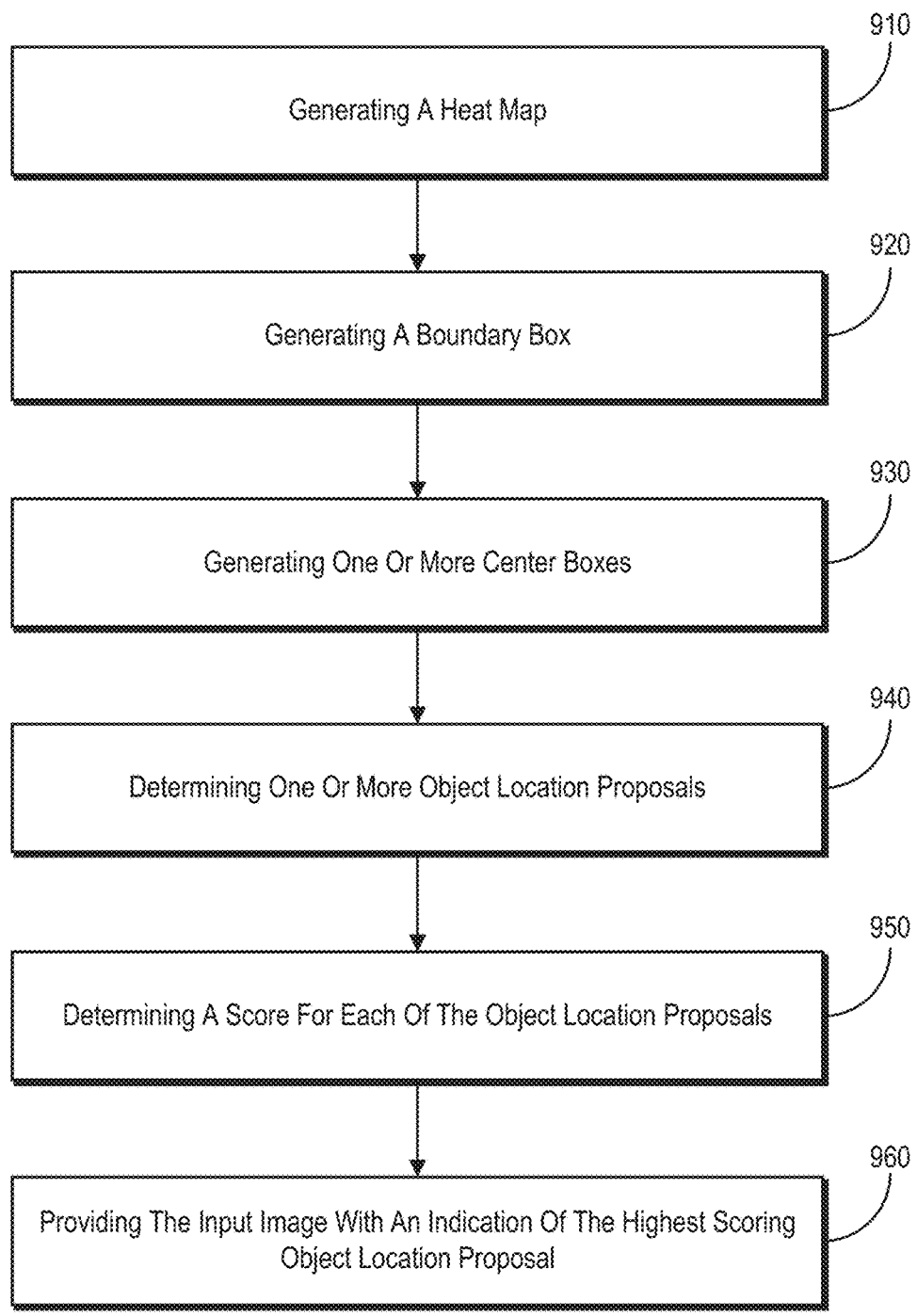
FIG. 9 illustrates a flowchart of steps in detecting an object in an input image in accordance with one or more embodiments.

Turning now to FIG. 9, this figure illustrates a flowchart of a series of acts 900 of detecting an object in an input image in accordance with one or more embodiments described herein. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer-readable medium can comprise instructions, that when executed by one or more processors, cause a computing device to perform the acts of FIG. 9. In still further embodiments, a system can perform the acts of FIG. 9.

As shown in FIG. 9, the series of acts 900 includes an act 910 of generating a heat map. For example, the act 910 can involve generating a heat map of an input image based on a target object keyword. In one or more embodiments, generating the heat map of an input image based on a target object keyword includes providing the input image and the target object keyword to a fully-convolutional network trained for dense image tagging.

Also, as shown in FIG. 9, the series of acts 900 includes an act 920 of generating a boundary box. For example, the act 920 can involve generating a boundary box in the heat map based on a global threshold. In one or more embodiments, generating a boundary box in the heat map based on the global threshold includes identifying all pixels in the heat map with a pixel value greater than a global threshold, determining a connected shape based on the identified pixels in the heat map, and fitting the boundary box to the connected shape in the heat map.

Additionally, the series of acts 900 includes an act 930 of generating one or more center boxes. For example, the act 930 can involve generating one or more center boxes in the heat map based on one or more local thresholds. In one or more embodiments, generating one or more center boxes in the heat map based on one or more local thresholds includes identifying pixels associated with a local maximum in every row and column in the heat map, determining a connected shape for each region of identified pixels, and fitting a center box to each connected shape.

The series of acts 900 further includes an act 940 of determining one or more object location proposals. For example, the act 940 can involve determining one or more object location proposals in the input image based on the target object keyword. In one or more embodiments, determining one or more object location proposals in the input image based on the target object keyword includes determining one or more object location proposals in the input image via one or more of a selective search method or a YOLO net method.

Additionally, as shown in FIG. 9, the series of acts 900 including an act 950 of determining a score for each of the object location proposals. For example, the act 950 can involve determining a score for each of the determined one or more object location proposals in the input image based on an overlap between the object location proposal and the boundary box and on an overlap between the object location proposal and the one or more center boxes. In one or more embodiments, determining a score for each of the determined one or more object location proposals in the input image includes: determining a score based on an amount of overlap between the object location proposal and the boundary box; determining a relevancy of an overlap between the object location proposal and each of the one or more center boxes; determining a mean pixel value of the object location proposal; and determining the score for the object location proposal based on the determined score based on the amount of overlap between the object location proposal and the boundary box, the relevancy of the overlap between the object location proposal and each of the one or more center boxes, and the determined mean pixel value of the object location proposal.

In at least one embodiment, determining the relevancy of the overlap between the object location proposal and each of the one or more center boxes includes: determining an intersection over union between the center box and the object location proposal; determining a score based on an amount of overlap between the center box and the object location proposal; determining a score based on an amount of overlap between the object location proposal and the center box; and determining the relevancy of the overlap between the object location proposal and the center box based on the determined intersection over union, the determined score based on the amount of overlap between the center box and the object location proposal, and the determined score based on the amount of overlap between the object location proposal and the center box.

Additionally, in one or more embodiments, the series of acts 900 includes an act of filtering out object location proposals with determined scores lower than a predetermined threshold. Moreover, in at least one embodiment, the series of acts 900 includes acts of filtering out object location proposals that are not covered by the boundary box in the heat map and filtering out object location proposals that are not covered by at least one of the one or more center boxes in the heat map. Furthermore, in one or more embodiments, the series of acts 900 includes an act of determining whether all of the one or more object location proposals have been filtered out. For example, if all of the one or more object location proposals have been filtered out, the act includes resizing one of the one or more center boxes. In that embodiment, providing the input image overlaid with the indication of the object location associated with the target object keyword is based on the resized center box.

Furthermore, as shown in FIG. 9, the series of acts 900 includes an act 960 of providing the input image with an indication of the highest scoring object location proposal. For example, the act 960 can involve providing, based on a highest scoring object location proposal, the input image overlaid with an indication of an object location associated with the target object keyword. In one or more embodiments, the indication of the object location is a bounding box with corner coordinates that match the corner coordinates of the highest scoring object location proposal.

The term "digital environment," as used herein, generally refers to an environment implemented, for example, as a stand-alone application (e.g., a personal computer or mobile application running on a computing device), as an element of an application, as a plug-in for an application, as a library function or functions, as a computing device, and/or as a cloud-computing system.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
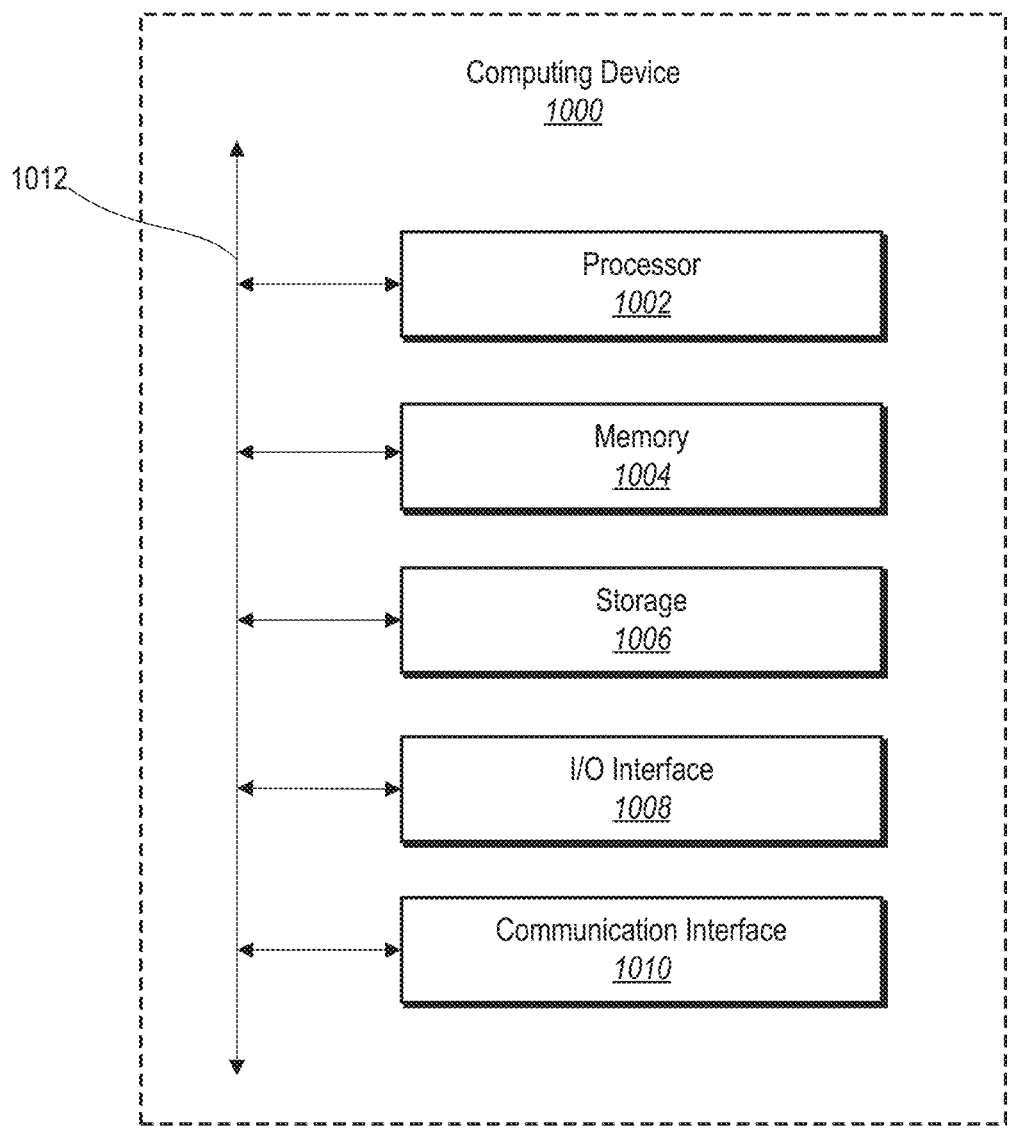
FIG. 10 illustrates a block diagram of an exemplary computing device in accordance with one or more embodiments.

FIG. 10 illustrates, in block diagram form, an exemplary computing device 1000 that may be configured to perform one or more of the processes described above. One will appreciate that the object detection system 702 can be implanted on implementations of the computing device 1000. As shown by FIG. 10, the computing device can comprise a processor 1002, memory 1004, a storage device 1006, an I/O interface 1008, and a communication interface 1010. In certain embodiments, the computing device 1000 can include fewer or more components than those shown in FIG. 10. Components of computing device 1000 shown in FIG. 10 will now be described in additional detail.

In particular embodiments, processor(s) 1002 includes hardware for executing instructions, such as those making up a computer program. As an example, and not by way of limitation, to execute instructions, processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 1004 may be internal or distributed memory. In one or more embodiments, the memory 1004 stores or comprises the data storage.

The computing device 1000 includes a storage device 1006 includes storage for storing data or instructions. As an example, and not by way of limitation, storage device 1006 can comprise a non-transitory storage medium described above. The storage device 1006 may include a hard disk drive (HDD), flash memory, a Universal Serial Bus (USB) drive or a combination of these or other storage devices. In one or more embodiments, the storage device 1006 stores or comprise the data storage.

The computing device 1000 also includes one or more input or output ("I/O") devices/interfaces 1008, which are provided to allow a user to provide input to (such as user strokes), receive output from, and otherwise transfer data to and from the computing device 1000. These I/O devices/interfaces 1008 may include a mouse, keypad or a keyboard, a touch screen, camera, optical scanner, network interface, modem, other known I/O devices or a combination of such I/O devices/interfaces 1008. The touch screen may be activated with a stylus or a finger.

The I/O devices/interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1008 is configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 can provide one or more interfaces for communication (such as, for example, packet-based communication) between the computing device and one or more other computing devices 1000 or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can comprise hardware, software, or both that couples components of computing device 1000 to each other.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps or acts or the steps or acts may be performed in differing orders. Additionally, the steps or acts described herein may be repeated or performed in parallel with one another or in parallel with different instances of the same or similar steps or acts. The scope of the present application is, therefore, indicated by the appended claims rather than by the foregoing description. All changes that come within the meaning and range of equivalency of the claims are to be embraced within their scope.

We claim:

1. A method for detecting one or more objects in a digital image comprising:
   generating a heat map of an input image by identifying portions of the input image likely to include an object corresponding to a target object keyword;
   determine one or more object location proposals in the input image based on the target object keyword;
   determine a score, based on an overlap between an object location proposal and one or more hot spots in the heat map, for each of the determined one or more object location proposals in the input image; and
   provide, based on a highest scoring object location proposal, the input image overlaid with an indication of an object location associated with the target object keyword.

2. The method as recited in claim 1, wherein generating the heat map of the input image comprises utilizing an embedding neural network to generate a color value for every pixel of the heat map that conveys a likelihood that a given pixel is part of the object corresponding to the target object keyword.

3. The method as recited in claim 2, further comprising identifying the one or more hot spots in the heat map by identifying regions of the heat map where one or more color values of each region match one or more a predetermined color values.

4. The method as recited in claim 3, further comprising generating one or more boundary boxes in the heat map based on the one or more hot spots in the heat map with color values above a global threshold by:
- identifying first pixels in the one or more hot spots in the heat map with color values greater than the global threshold;
- determining connected first shapes based on the identified first pixels; and
- fitting the one or more boundary boxes to the connected first shapes.

5. The method as recited in claim 4, further comprising generating one or more center boxes in the heat map based on the one or more hot spots in the heat map by:
- identifying second pixels associated with a local maximum color value in rows and columns in the one or more hot spots in the heat map;
- determining connected second shapes based on the identified second pixels; and
- fitting a center box to each connected second shape.

6. The method as recited in claim 5, wherein determining the one or more object location proposals in the input image comprises identifying coordinates outlining one or more predicted regions in the input image that include at least one object corresponding to the target object keyword.

7. The method as recited in claim 6, wherein determining the score for each of the determined one or more object location proposals comprises:
- determining amounts of overlap between the one or more object location proposals and the one or more boundary boxes;
- determining relevancies of the one or more object location proposals based on overlaps between the one or more object location proposals and the one or more center boxes;
- determining mean pixel values of the one or more object location proposals; and
- determining the scores for the determined one or more object location proposals based on the amounts of overlap, the relevancies of the one or more object location proposals, and the mean pixel values.

8. The method as recited in claim 7, wherein determining the relevancies of the one or more object location proposals based on overlaps between the one or more object location proposals and the one or more center boxes comprises:
- determining intersections over unions between the one or more center boxes and the one or more object location proposals;
- determining first overlap scores based on amounts of overlap between the one or more center boxes and the one or more object location proposals;
- determining second overlap scores based on amounts of overlap between the one or more object location proposals and the one or more center boxes; and
- determining the relevancies of the one or more object location proposals based on the determined intersections over unions, the determined first overlap scores, and the determined second overlap scores.

9. The method as recited in claim 8, further comprising filtering out object location proposals with determined scores lower than a predetermined threshold by:
- filtering out object location proposals that are not covered by at least one boundary box; and
- filtering out object location proposals that are not covered by at least one center box.

10. In a digital environment for detecting object locations in digital images, a non-transitory computer-readable storage medium having stored thereon computer-executable instructions that, when executed by a processor, cause a computing device to:
- generate a heat map of an input image based on a target object keyword;
- determine one or more object location proposals in the input image based on the target object keyword;
- determine a score for each of the determined one or more object location proposals in the input image based on an overlap between an object location proposal and one or more hot spots of heat map; and
- provide, based on a highest scoring object location proposal, an indication of an object location associated with the target object keyword.

11. The non-transitory computer-readable storage medium as recited in claim 10, further comprising computer-executable instructions that cause the computing device to generate the heat map of the input image by utilizing an embedding neural network that maps the input image and associated tag lists into a common embedding space.

12. The non-transitory computer-readable storage medium as recited in claim 11, further comprising computer-executable instructions that cause the computing device to generate the heat map of the input image by generating the heat map comprising a plurality of pixels, wherein a color value of every pixel of the heat map conveys a likelihood that a corresponding pixel in the input image is part of an object corresponding to the target object keyword.

13. The non-transitory computer-readable storage medium as recited in claim 12, further comprising computer-executable instructions that cause the computing device to further generate the heat map such that pixels in the heat map with increased intensities of color values represent increased likelihoods that the corresponding pixels in the input image are part of an object corresponding to the target object keyword.

14. The non-transitory computer-readable storage medium as recited in claim 12, wherein the embedding neural network comprises a fully-convolutional dense tagging neural network.

15. The non-transitory computer-readable storage medium as recited in claim 10, further comprising computer-executable instructions that cause the computing device to generate a boundary box in the heat map based on the one or more hot spots in the heat map with color values above a global threshold by:
- identifying first pixels in the one or more hot spots in the heat map with color values greater than the global threshold;
- determining a connected first shape based on the identified first pixels; and
- fitting the boundary box to the connected first shape.

16. The non-transitory computer-readable storage medium as recited in claim 15, further comprising computer-executable instructions that cause the computing device to generate one or more center boxes in the heat map based on the one or more hot spots in the heat map by:
- identifying second pixels associated with a local maximum color value in rows and columns in the one or more hot spots in the heat map;
- determining connected second shapes based on the identified second pixels; and
- fitting a center box to each connected second shape.

17. The non-transitory computer-readable storage medium as recited in claim 16, further comprising computer-executable instructions that cause the computing device to determine the score for each of the determined one or more object location proposals in the input image by determining, for each of the one or more object location proposals:
- an amount of overlap between the object location proposal and the boundary box;
- a relevancy of the object location proposal based on an overlap between the object location proposal and each of the one or more center boxes;
- a mean pixel value of the object location proposal; and
- the score for the object location proposal based on the amount of overlap between the object location proposal and the boundary box, the relevancy of the object location proposal, and the mean pixel value of the object location proposal.

18. The non-transitory computer-readable storage medium as recited in claim 17, further comprising computer-executable instructions that cause the computing device to:
- in response to filtering out all of the one or more object location proposals due to low determined scores, resize one center box of the one or more center boxes; and
- use the resized center box as the object location associated with the target object keyword.

19. A system comprising:
- one or more memory devices comprising a dense tagging neural network; and
- one or more computing devices configured to cause the system to:
- receive, from a client computing device an input image and a target object keyword;
- generate a heat map of the input image by utilizing the dense tagging neural network to identify portions of the input image likely to include an object corresponding to the target object keyword;
- determine one or more object location proposals in the input image based on the target object keyword;
- determine a score for each of the determined one or more object location proposals in the input image based on an overlap between an object location proposal and one or more hot spots in the heat map; and
- provide, to the client computing device and based on a highest scoring object location proposal, an indication of an object location associated with the target object keyword.

20. The system as recited in claim 19, wherein the one or more computing devices are further configured to cause the system to:
- generate a boundary box in the heat map based on the one or more hot spots in the heat map with color values above a global threshold;
- generate one or more center boxes in the heat map based on the one or more hot spots in the heat map with local maximum color values; and
- determine the score for each of the determined one or more object location proposals in the input image based on overlaps between the object location proposal, the boundary box, and the one or more center boxes.

* * * * *